US010088861B2

(12) United States Patent
McCarthy et al.

(10) Patent No.: US 10,088,861 B2
(45) Date of Patent: Oct. 2, 2018

(54) HIGH ACCURACY VOLTAGE REFERENCES

(71) Applicant: Microsoft Technology Licensing, LLC, Redmond, WA (US)

(72) Inventors: Shaun M. McCarthy, Palo Alto, CA (US); Mustansir Y. Mukadam, San Francisco, CA (US); Stefan M. Wurster, Livermore, CA (US); Barry Thompson, Menlo Park, CA (US); Dane R. Snow, Santa Clara, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/465,776

(22) Filed: Mar. 22, 2017

(65) Prior Publication Data

US 2018/0143658 A1    May 24, 2018

Related U.S. Application Data

(60) Provisional application No. 62/424,886, filed on Nov. 21, 2016.

(51) Int. Cl.
*G05F 3/00* (2006.01)
*G05F 3/20* (2006.01)
*G01K 7/01* (2006.01)

(52) U.S. Cl.
CPC .............. *G05F 3/205* (2013.01); *G01K 7/01* (2013.01)

(58) Field of Classification Search
None
See application file for complete search history.

(56) References Cited

U.S. PATENT DOCUMENTS 5,563,504 A * 10/1996 Gilbert .................... G05F 3/267
323/313
7,461,972 B2   12/2008 Cohen
7,969,223 B1    6/2011 Gilbert
(Continued)

OTHER PUBLICATIONS

Kester, et al, "Analog Devices: Sensor Signal Conditioning, Temperature Sensors", Published in 1999 Available at: http://www.analog.com/media/cn/training-seminars/design-handbooks/temperature_sensors_chapter7.pdf?doc=CN0381.pdf, 39 pages.

*Primary Examiner* — Adolf Berhane
*Assistant Examiner* — Henry Lee, III
(74) *Attorney, Agent, or Firm* — Alleman Hall Creasman & Tuttle LLP

(57) ABSTRACT

Two transistors are connected between a power source and separate current references. The base of the first transistor is connected to a bias voltage, and the base of the second transistor is connected to the output of a differential amplifier. The amplifier inputs are connected to the nodes where the transistors are connected to the current references. The transistors and the current references may be of different sizes, such that the output voltage of the amplifier is a function of temperature and of the product of the ratios of the transistors and the current references. A number of switches may be employed such that, in alternative modes of operation, the amplifier is used to buffer the bias voltage, the offset of the amplifier, the output of the first transistor, and/or a stored sample of the temperature output voltage, which are combined to arrive at an adjusted temperature reading.

20 Claims, 21 Drawing Sheets

(56) References Cited

U.S. PATENT DOCUMENTS

| | | |
|---|---|---|
| 8,207,776 B1 | 6/2012 | Gilbert |
| 2005/0179575 A1 | 8/2005 | McLeod et al. |
| 2010/0013545 A1 | 1/2010 | DiTommaso |

* cited by examiner

HIGH ACCURACY VOLTAGE REFERENCES

CROSS REFERENCE TO RELATED APPLICATIONS

This application claims the benefit of U.S. Provisional Application Ser. No. 62/424,886, filed Nov. 21, 2016, the disclosure of which is hereby incorporated by reference as if set forth in its entirety herein.

BACKGROUND

Transducers such as temperature sensors, pressure sensors, and strain sensors may include or be paired with amplifiers. Such transducers include differential temperature sensors, such as proportional-to-absolute-temperature (PTAT) and translinear PTAT circuits.

SUMMARY

A temperature reference circuit includes a first and second transistor that are connected to a common power source, and also connected to a first and a second current reference, respectively. The base of the first transistor is connected to a bias voltage, and the base of the second transistor is connected to the output of a differential amplifier. The inputs of the differential amplifier are connected to the nodes where the transistors are connected to the current references. The transistors and the current references may be of different sizes, such that the output voltage of the amplifier is a function of temperature and of the product of the ratios of the transistors and the current references.

A number of switches may be used such that, in alternative modes of operation, the differential amplifier is used to buffer the bias voltage, measure the output voltage of the first transistor, and/or a stored sample of the temperature output voltage. These readings may be combined in a number of ways to arrive at an adjusted temperature reading.

The circuit may further include, for example, a switched capacitor amplifier and a variety of switches to allow, in various modes, for the sampling of the output of the differential amplifier and various measurements whereby errors of the system are self-cancelling.

This summary is provided to introduce a selection of concepts in a simplified form that are further described below in the detailed description. This summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

DETAILED DESCRIPTION

Figure 1:
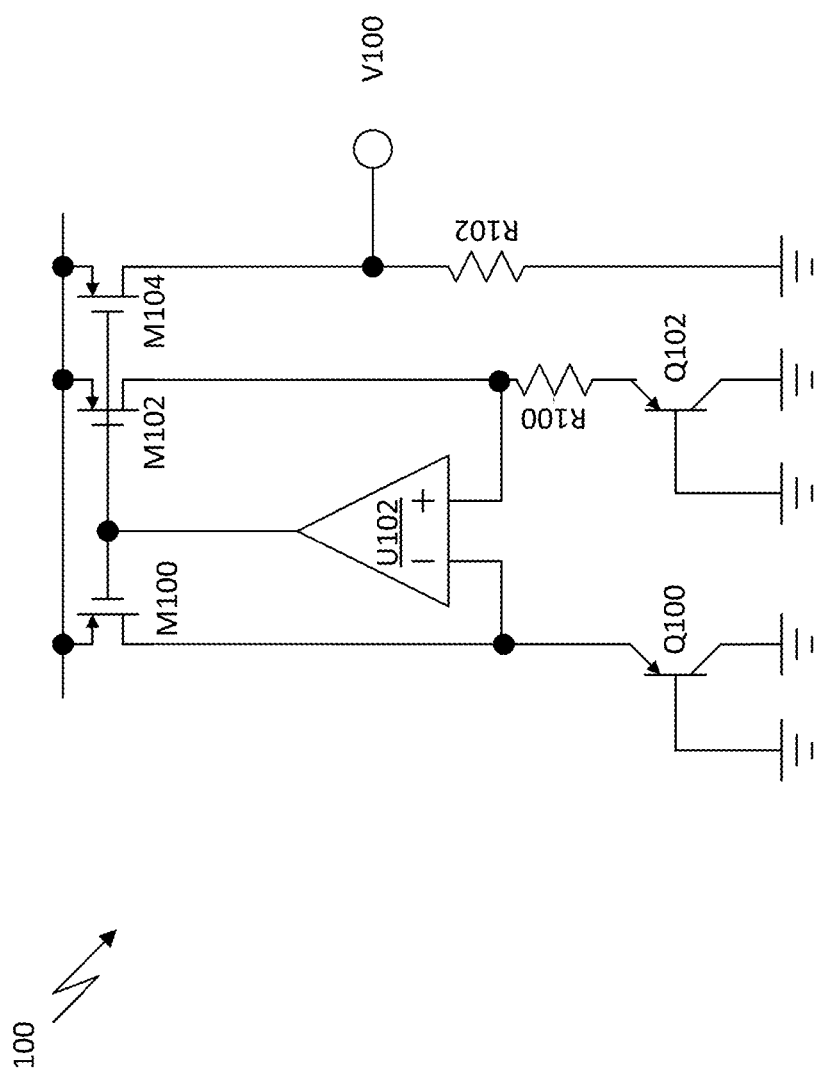
FIG. 1 is a schematic of an example circuit with a proportional-to-absolute-temperature (PTAT) analog reference generator.

A temperature reference circuit includes a first and second transistor that are connected to a common power source, and also connected to a first and a second current reference, respectively. The base of the first transistor is connected to a bias voltage, and the base of the second transistor is connected to the output of a differential amplifier. The inputs of the differential amplifier are connected to the nodes where the transistors are connected to the current references. The transistors and the current references may be of different sizes, such that the output voltage of the amplifier is a function of temperature and of the product of the ratios of the transistors and the current references.

A number of switches may be used such that, in alternative modes of operation, the amplifier is used to buffer the bias voltage, measure the output of the first transistor, and/or a stored sample of the temperature output voltage. These readings may be combined in a number of ways to arrive at an adjusted temperature reading.

The circuit may further include, for example, a switched capacitor amplifier and a variety of switches to allow, in various modes, for the sampling of the output of the differential amplifier and various measurements whereby errors of the system are self-cancelling.

A transducer, such as a proportional-to-absolute-temperature (PTAT) or zero-to-absolute-temperature (ZTAT) reference device, uses two amplifiers, where each amplifier is used in a variety of modes. First, the first amplifier generates a temperature-dependent measurement voltage though feedback in an analog circuit. Next, the second amplifier samples and integrates the measurement in a switched-capacitor mode, and the output is stored on a capacitor. Then, the first amplifier is set to measure its offset. The offset and bias voltages are sampled and integrated by the second amplifier, and the output is stored on a second capacitor. Then, the first and second amplifiers are set to buffer the voltages stored on the capacitors. The measurement can then be offset-adjusted by digital or analog means. The adjusted measurement is then available to be used for calibration of, e.g., an image sensor. For example, the image sensor may be part of a color camera, where thermal calibration is useful in capturing true colors. Alternatively, the image sensor may be part of a depth camera system such as a time-of-flight depth camera useful in determining the position and movements of a player in a video gaming system, where thermal calibration is useful in making more accurate assessments of player position and movements.

The analog sensor circuit may be a proportional-to-absolute-temperature (PTAT) circuit that includes two scaled BJT transistors, two scaled current sources, and a first amplifier that is used in a feedback loop. The differential inputs of the amplifier are connected to the emitters of the BJTs. The output of the first amplifier drives the base voltage of one BJT and generates a PTAT voltage at its output. The PTAT voltage may be used to precisely measure the temperature of the system and to generate a ZTAT voltage when combined with a CTAT voltage.

Unlike many other PTAT circuits, there are no resistors, and therefore there is no need for high resistor values or for close resistor value matching. Relying on scaling ratios instead of precise resistor matching provides a more accurate PTAT system that is robust to process sensitivities and mismatch.

The PTAT voltage is amplified by a second amplifier operating as a switched capacitor amplifier with ratio-metric gain. The gain may be programmed by setting the number of iterations of the switched-capacitor sample and integration phases.

Both amplifiers are reused, first to take an offset reading, and then to buffer temperature measurement and offset readings. The reuse of the amplifiers provides not only the economy of reduced integrated circuit area and power savings, but also provides for self-cancelling operations whereby the output is essentially unaffected by variations in bias voltage values or the offsets of either amplifier. This provides very high linearity of the system over wide temperature variations, which in turn reduces the need for system calibration. Similarly, components used to produce the PTAT voltage are reused to produce the CTAT voltage, thus reducing circuit area and power consumption.

The techniques for programmable gain, error cancelling, and reuse of components may be applied to other transducer types, such as a non-translinear differential temperature sensor, a pressure sensor, strain sensor, gyroscope, magnetometer, accelerometer, or xyz positioning sensor.

FIG. 1 is a schematic of a proportional-to-absolute-temperature (PTAT) circuit 100 with analog reference generators. Two scaled bipolar junction transistors (BJTs) Q100 and Q102, where Q102 is M times larger than Q100, provide output current components with a temperature dependence. The emitter terminal of Q100 is connected to the negative inputs of an amplifier U102. The emitter terminal of Q102 is connected to the positive input of the amplifier through resistor R100. The output of amplifier U102 is fed to the gates of MOSFETs M100, M102, and M104 to generate currents. The sources of MOSFETs M100, M102, and M104 are connected to a positive supply voltage. The drain of MOSFET M100 feeds the emitter of BJT Q100. The drain of MOSFET M102 feeds the emitter of BJT Q102 through a resistor R100. The drain of MOSFET M104 feeds another resister R102, to provide an output voltage V100, where the other end of R102 is connected to ground. By connecting the gate of M100, M102, and M104, the reference current through the BJTs is translated to the temperature-dependent voltage V100 through resistor R102. The output of U102 is a ZTAT voltage. V100 is a PTAT voltage.

The topology of FIG. 1 has a low gain and requires large resistor values and precise matching to reduce process sensitivity. The single-ended nature of the reference voltages leads to issues related to non-linearity, decreased noise immunity, and degraded system sensitivity. This may lead to unpredictability in measured temperature, even over a moderate range of temperature. Also, the amplifier U102 used to generate $\Delta V_{BE}$ in the feedback configuration of FIG. 1 suffers from input referred offsets of U102 which translate to uncertainties in the temperature-dependent output.

Figure 2:
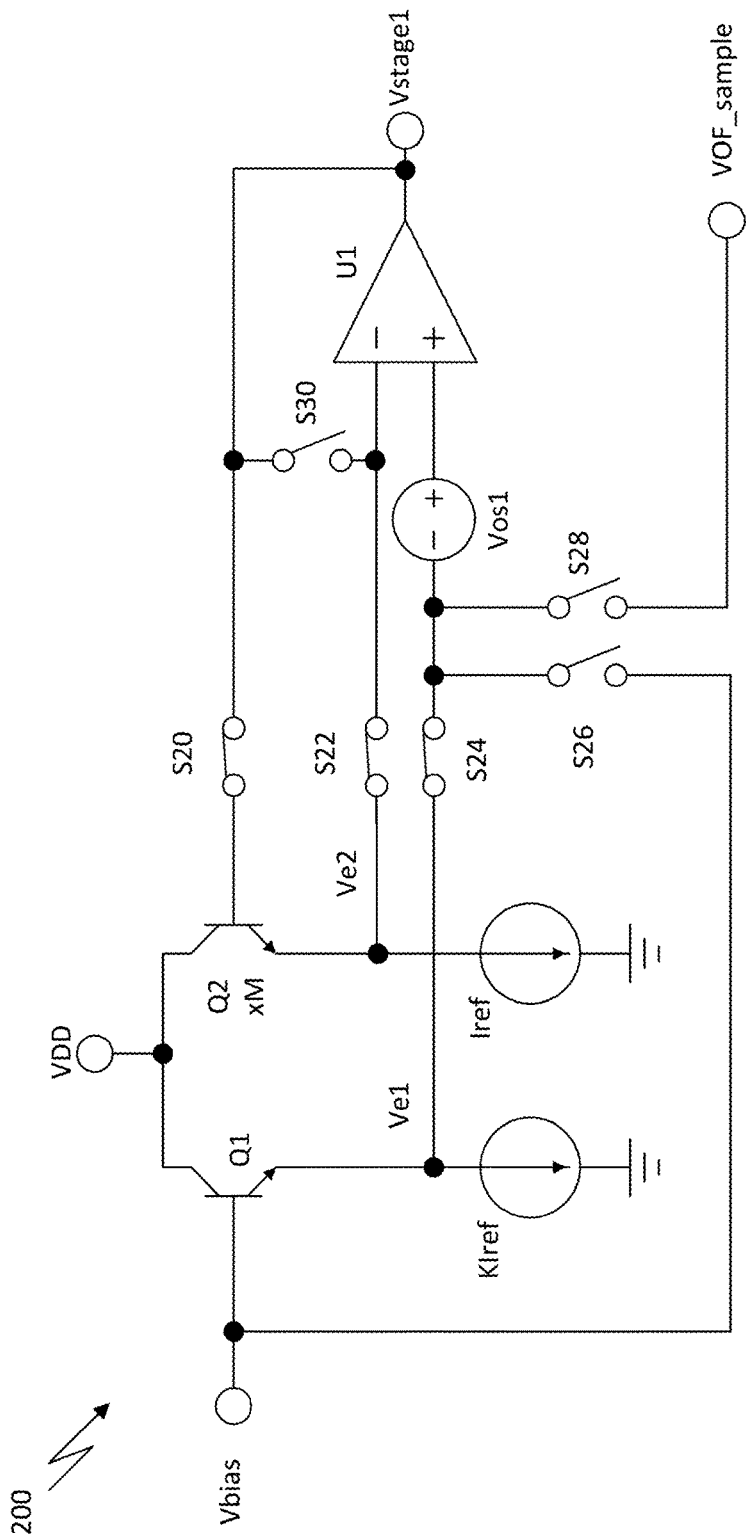
FIG. 2 is a schematic of an example trans-linear temperature sensor stage, including an amplifier with multiple modes of operation, with switches set to take a temperature measurement.

FIG. 2 is a schematic of an example transducer in the form of a trans-linear temperature sensor stage 200. Q1 and Q2 are NPN BJT transistors that may be of different sizes, where Q2 is scaled by a factor of M relative to Q1. The collectors of Q1 and Q2 are connected to positive supply voltage VDD. The emitter of Q2 is connected to a current source $I_{ref}$. The current sources are designed using ratio-metric NMOS transistors in a cascode configuration. In practice, they may be accurately matched in chip layout. The emitter of Q1 is connected to a scaled current source $KI_{ref}$, where K is a factor relative to $I_{ref}$. The emitters are further connected through switches S22 and S24 to the negative and positive inputs of an operational amplifier (op-amp) U1. Op-amp U1 may be implemented, for example, in a folded cascode configuration. The output of op-amp U1 is connected to the base of transistor Q2 via switch S20 in a negative feedback configuration. The base of Q1 is connected to an external voltage $V_{bias}$. The input-referred offset of the op-amp U1 is depicted in FIG. 2 as $V_{OS1}$.

In FIG. 2, switches S20, S22, and S24 are shown closed. In this configuration, the sensor stage 200 is used to generate a voltage Vstage1 that is complementary to temperature. Switches S26, S28, and S30 are used to set the sensor stage 200 to other operational modes. With S20, S22, and S24 open, switch 30 may be closed to place op-amp U1 in unity gain mode. Switch 26 or switch 28 may then be closed to connect either $V_{bias}$ or $V_{OF\_sample}$ to the positive input of op-amp U1, so that op-amp U1 of sensor stage 200 may serve to buffer these voltages.

With switches S20, S22, and S24 closed and switches S26, S28, and S30 open, as shown in FIG. 2, sensor stage 200 is in temperature measurement mode. In this mode, the currents through BJTs Q1 and Q2 are given by Equations 1 and 2 in terms of the reference current $I_{ref}$, the current scaling factor K, and the BJT scaling factor M, where $I_S$ is the base current and $V_T$ is the thermal voltage. The thermal voltage $V_T$=kT/q, where k is Boltzmann's constant, q is the charge of an electron, and T is the temperature.

$$I_{Q1} = KI_{ref} = I_S e^{\frac{V_{be1}}{V_T}} \qquad \text{Equation 1}$$

-continued $$I_{Q2} = I_{ref} = MI_S e^{\frac{V_{be2}}{V_T}} \quad \text{Equation 2}$$

Equations (1) and (2) can be rewritten in terms of the base emitter voltages of the transistors Q1 and Q2 as Equations 3 and 4.

$$V_{be1} = V_T \ln\left(\frac{KI_{ref}}{I_S}\right) \quad \text{Equation 3}$$

$$V_{be2} = V_T \ln\left(\frac{I_{ref}}{MI_S}\right) \quad \text{Equation 4}$$

Since the op-amp U1 is designed to have a very high gain, $V_{e1} = V_{e2}$. The output voltage $V_{stage1}$ of the op-amp U1 is thus given by Equation 5.

$$V_{stage1} = V_{e2} + V_{be2} = V_{e1} + V_{os1} + V_{be2} \rightarrow V_{stage1} = V_{bias} - V_{be1} + V_{os1} + V_{be2} \rightarrow V_{stage1} = V_{bias} + V_{os1} + V_{be2} - V_{be1} \quad \text{Equation 5}$$

$\Delta V_{BE}$, the difference in the base emitter voltages of the two transistors Q1 and Q2, is then given in Equation 6, where kT/q is the thermal voltage $V_T$.

$$V_{be2} - V_{be1} = \frac{kT}{q}\left(\ln\left(\frac{KMI_{ref}I_S}{I_{ref}I_S}\right)\right) \quad \text{Equation 6}$$

Substituting (6) in (5), the output $V_{stage1}$ of the op-amp U1 can be represented in terms of the temperature-dependent voltage and an offset term in Equation 7.

$$V_{stage1} = \underbrace{V_{bias} + V_{os1}}_{Offset} - \underbrace{\frac{kT}{q}(\ln(KM))}_{Slope} \quad \text{Equation 7}$$

In Equation 7, the output of the op-amp U1 has a temperature-dependent, process invariant voltage determined by the scaling ratio M of the NPN devices Q1 and Q2, the current sources $I_{ref}$ and $KI_{ref}$, Boltzmann's constant k, and the charge of an electron q. The output voltage also has an offset term determined by the bias voltage of Q1 and the offset of the op-amp.

Figure 3:
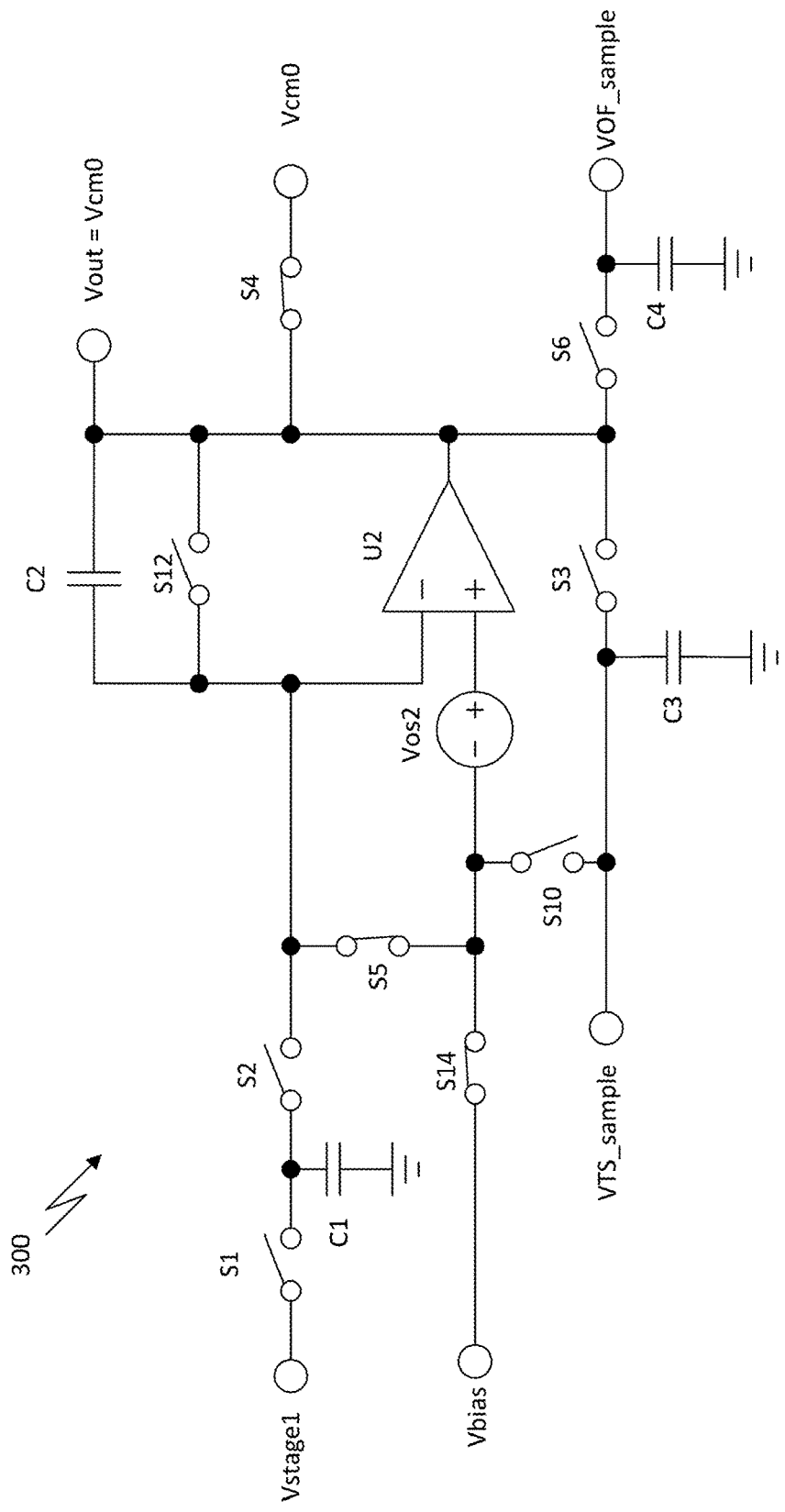
FIG. 3 is a schematic of an example switched capacitor gain stage, including an amplifier with multiple modes of operation, with switches set to clear the gain stage.

FIG. 3 is a schematic of a switched capacitor gain stage 300 which may be used to amplify the outputs $V_{stage1}$ of the sensor stage 200 of FIG. 2. The $V_{stage1}$ input is connected to $V_{stage1}$ output of FIG. 2.

In FIG. 3, there is a second high gain op-amp U2. Op-amp U2 also may be implemented, for example, as a folded cascode configuration op-amp similar to op-amp U1. Op-amp U2 is depicted as having an input referred offset $V_{OS2}$. Capacitors C1 and C2 are used as ratio-metric amplification terms for voltage amplification. Capacitor C3 is used to sample and hold an amplified temperature sensor voltage $V_{TS\_sample}$. Capacitor C4 is used to sample and hold an amplified offset voltage $V_{OF\_sample}$. $V_{cm0}$ is an externally applied common mode voltage used to reset the gain stage 300. $V_{bias}$ is the same voltage that was also applied, e.g., to the base of BJT Q1 in FIG. 2.

The switches in FIG. 3 are used to set the operation mode of the gain stage 300. Sample switch S1 is used for sampling the input $V_{stage1}$ onto sample capacitor C1 during a sample phase. Integrate switch S2 connects the sample capacitor C1 to the input negative differential input of op-amp U2 during an integrate phase. Hold switch S3 is used to connect the op-amp U2 output voltage $V_{out}$ to the hold capacitor C3 for sensor readings. Hold switch S6 is used to connect the output voltage Vout to the hold capacitor C4 for offset readings. Switches S4 and S5 are used to clear the integrator, by resetting the inputs to the op-amp U1 and the voltage across C2. Switch S14 connects $V_{bias}$ to the positive differential input of the op-amp U2 during sample, integrate, and hold modes. Unity gain switch S12 sets the op-amp U2 into unity buffer mode. Switch S10 connects the hold capacitor C3 to the positive differential input of the op-amp U2 for buffering.

FIG. 3 shows the gain stage 300 in clear mode, with switches S4, S5, and S14 closed. The remaining switches are open. This sets the initial conditions for sample, integrate, and hold operations.

Figure 4:
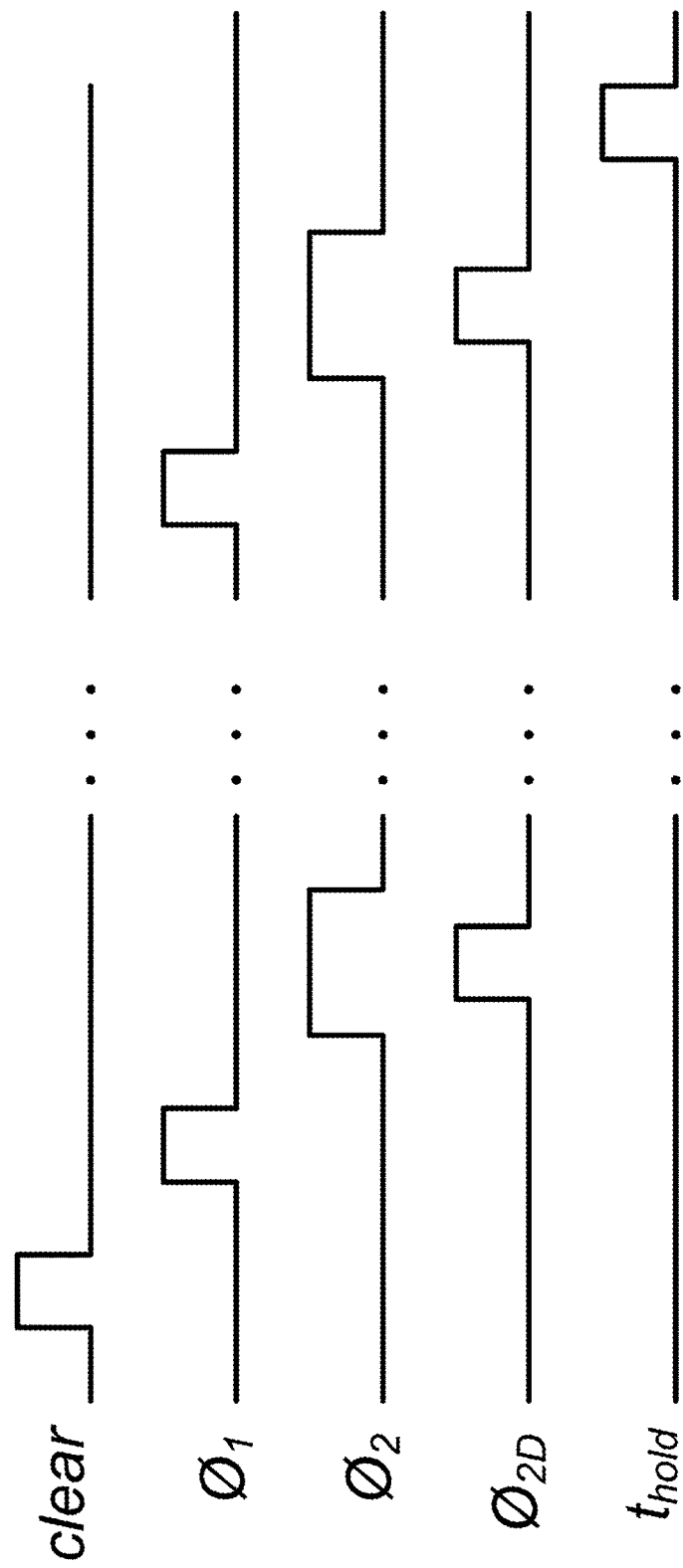
FIG. 4 is an example timing diagram for various clear, sample, integration, and hold modes of operation of configurable amplifiers.

FIG. 4 is an example timing diagram for operations of gain stage 300. First a sample phase φ1 is conducted, followed by an integrate phase φ2. Phases φ1 and φ2 may be repeated N times to increase op-amp U2 output voltage $V_{out}$. At the end of the integrate cycles, at $t_{hold}$, output voltage $V_{out}$ is connected to one of the hold capacitors, either C3 or C4. (φ2D is a sampling period in the ZTAT mode.)

Figure 5:
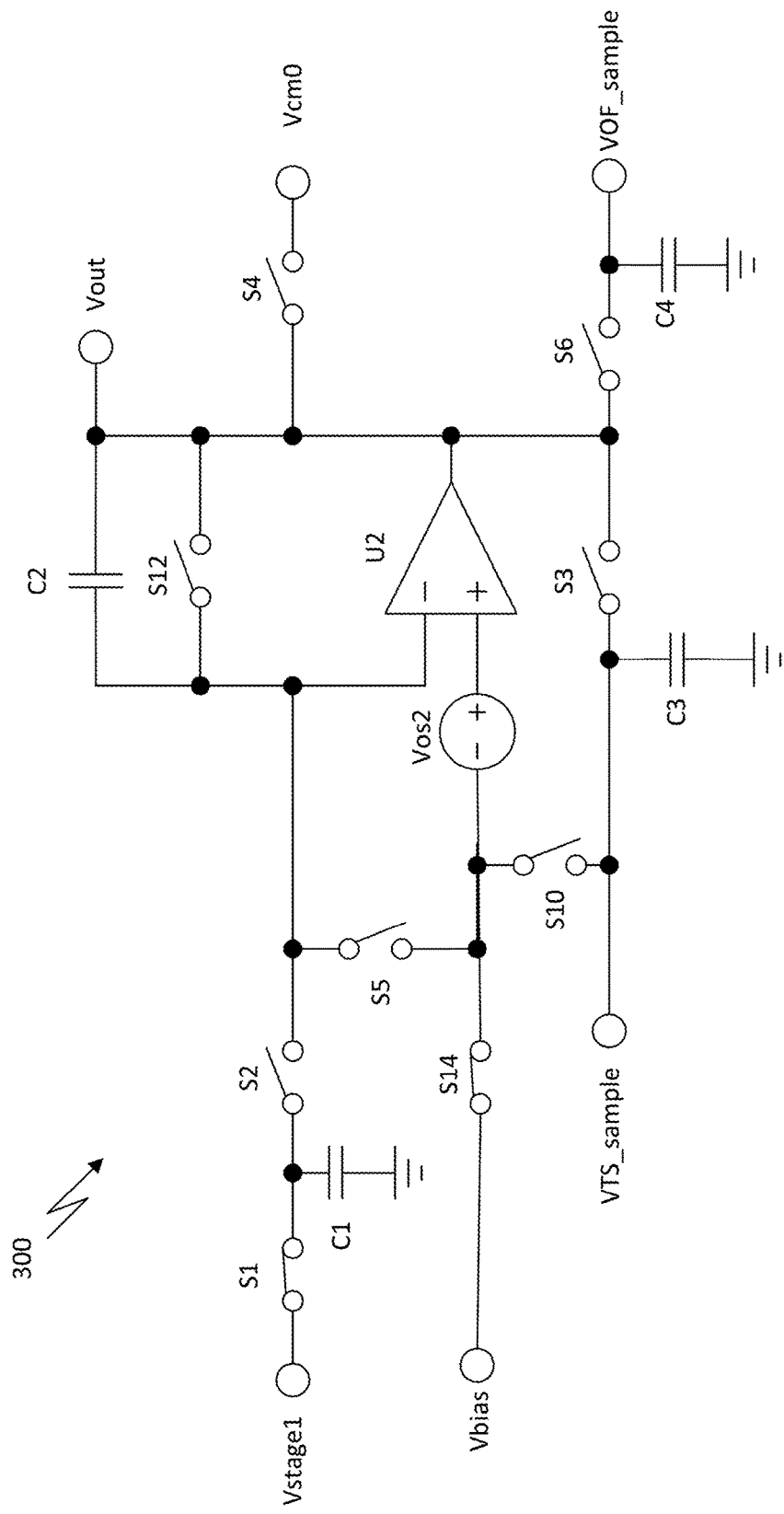
FIG. 5 is a schematic of the gain stage of FIG. 3 with switches set to sample the input from the sensor stage.

FIG. 5 shows the gain stage 300 with the switches set for input sampling. As shown in FIG. 5, the clear switches S4 and S5 are opened, and sample switch S1 is closed, e.g., as set by the control signal φ1 signal of FIG. 4. Here in FIG. 5, the input voltage $V_{stage1}$ is now connected to sample capacitor C1. The charge on capacitors C1 and C2 is given by Equations 8A and 8B, where $V_{out0}$ is the initial voltage at the output of op-amp U1, which has been set during the clear mode to $V_{cm0}$.

$$Q_{C1} = V_{stage1} C_1 \quad \text{Equation 8A}$$

$$Q_{C2} = (V_{bias} + V_{os2} - V_{out0}) C_2 \quad \text{Equation 8B}$$

Figure 6:
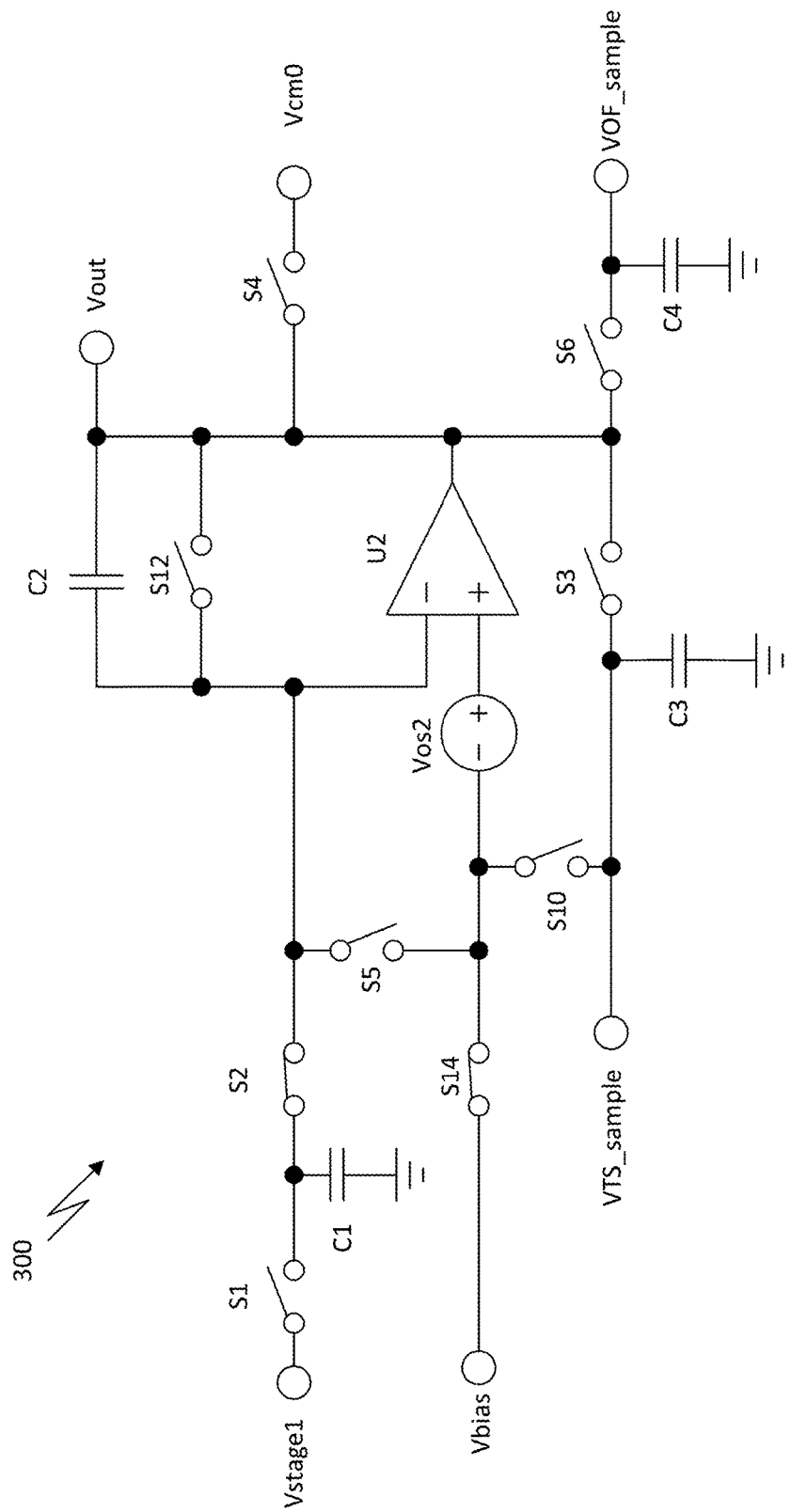
FIG. 6 is a schematic of the gain stage of FIG. 3 with switches set to integrate the sampled input signal.

FIG. 6 shows the gain stage 300 with the switches set for integrate operation. As shown in FIG. 6, sample switch S1 is opened and integrate switch S2 is closed, e.g., by control signal φ2 of FIG. 4. Here in FIG. 6, the sampled voltage $V_{stage1}$ on C1 is ratio-metrically amplified by C2. The charges on C1 and C2 at the end of this cycle are given by Equations 9A and 9B, where $V_{out1}$ is the new value of op-amp U1 output $V_{out}$.

$$Q_{C1} = (V_{bias} + V_{os2}) C_1 \quad \text{Equation 9A}$$

$$Q_{C2} = (V_{bias} + V_{os2} - V_{out1}) C_2 \quad \text{Equation 9B}$$

Since the total charge between the sample phase and the integrate phase is conserved, the charge on C2 can also be written as Equation 10.

$$Q_{C2} = (V_{bias} + V_{os2} - V_{out0}) C_2 + (V_{stage1} - V_{bias} - V_{os2}) C_1 \quad \text{Equation 10}$$

The output voltage at the end of integration is given in Equation 11.

$$V_{out1} = V_{out0} + \frac{C_1}{C_2}(V_{bias} + V_{os2} - V_{stage1}) \quad \text{Equation 11}$$

The sample-integrate operation may be repeated for N cycles using non-overlapping switch controls, e.g., signals φ1 and φ2 of FIG. 4, to control switches S1 and S2 of gain stage 300. The output voltage at the end of the $N^{th}$ cycle is given in Equation 12.

$$V_{outN} = V_{out0} + \frac{NC_1}{C_2}(V_{bias} + V_{os2} - V_{stage1}) \qquad \text{Equation 12}$$

N is programmable and, along with the capacitor ratio, sets the overall gain of the gain stage 300.

Figure 7:
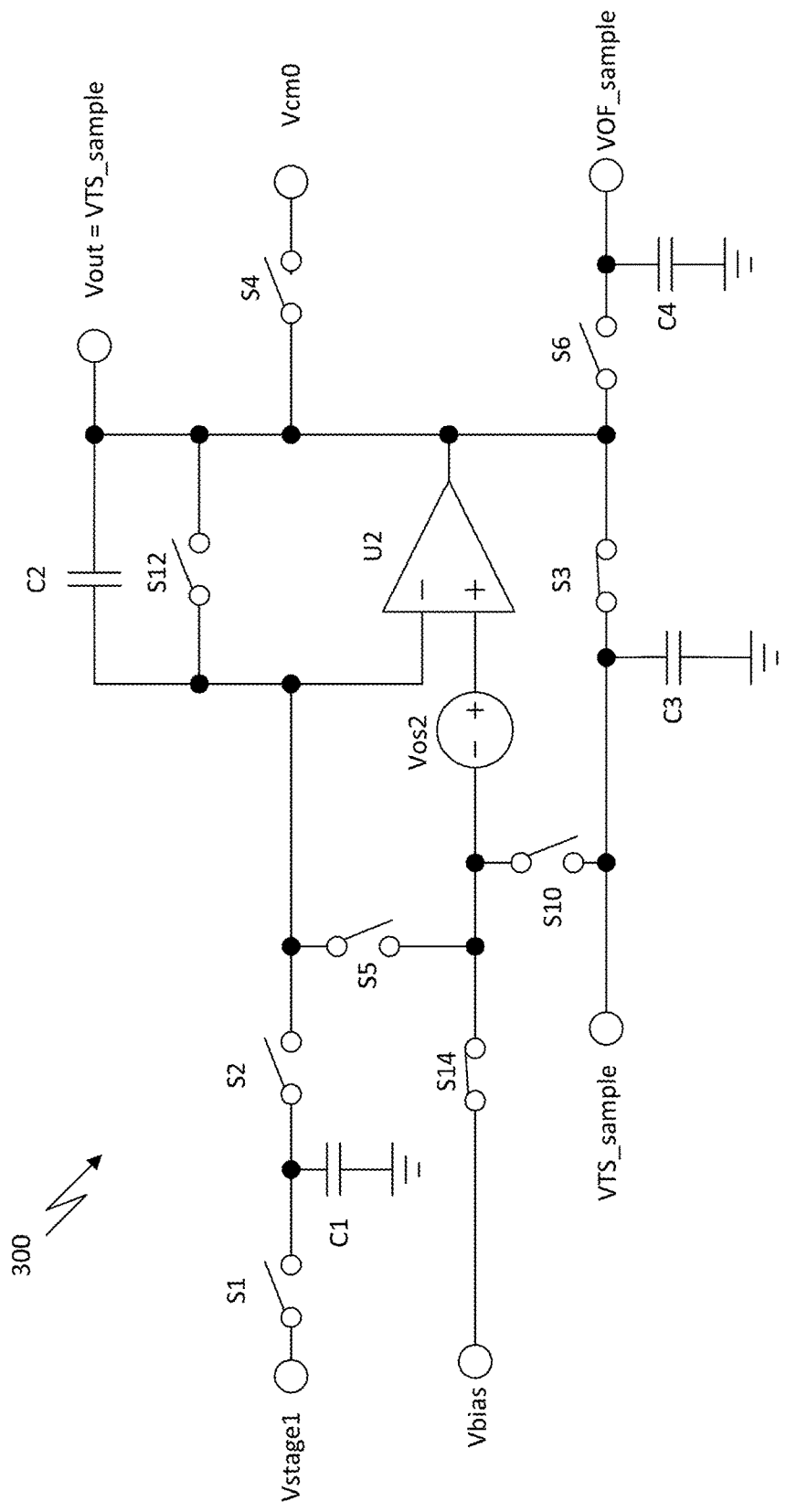
FIG. 7 is a schematic of the gain stage of FIG. 3 with switches set to hold temperature measurement reading onto a capacitor.

FIG. 7 shows the gain stage 300 with the switches set for temperature measurement output hold. Switches S1 and S2 are opened. Hold switch S3 is closed, e.g., by control signal $t_{hold}$ of FIG. 4. The voltage across C3 at the end of the hold cycle is given in Equation 13.

$$V_{hold} = V_{out0} + \frac{NC_1}{C_2}(V_{bias} + V_{os2} - V_{stage1}) \qquad \text{Equation 13}$$

Since it is the output of the temperature sensor that is being amplified, Equation 7 may be substituted for $V_{stage1}$ to determine the amplified temperature-dependent voltage on C3, as given in Equation 14 where $V_{hold}$, the voltage across C3, is now be referred to as $V_{TS\_Sample}$.

$$V_{TS\_Sample} = V_{out0} + \underbrace{N\frac{C_1}{C_2}(V_{OS2} - V_{OS1})}_{Offset} + \underbrace{N\frac{C_1}{C_2}\left(\frac{k}{q}\right)\ln(KM)T}_{Slope} \qquad \text{Equation 14}$$

Equation 14 contains the temperature-dependent term from the temperature sensor amplified by a factor of $NC_1/C_2$ where N is the number of sample-integrate cycles. It is also important to note that $V_{bias}$ is not present in the equation. The exact value of $V_{bias}$ is not critical.

The offsets of op-amps U1 and U2 are also amplified by the factor $NC_1/C_2$. Unless corrected, this may lead to inaccurate, process dependent temperature readings. To eliminate the offsets of both op-amps from the final output, an offset-only sample cycle may be employed where only the offset voltages $V_{os1}$ and $V_{os2}$ are measured. This may be achieved by adjusting the switch settings of sensor stage 200 and gain stage 300.

Figure 8:
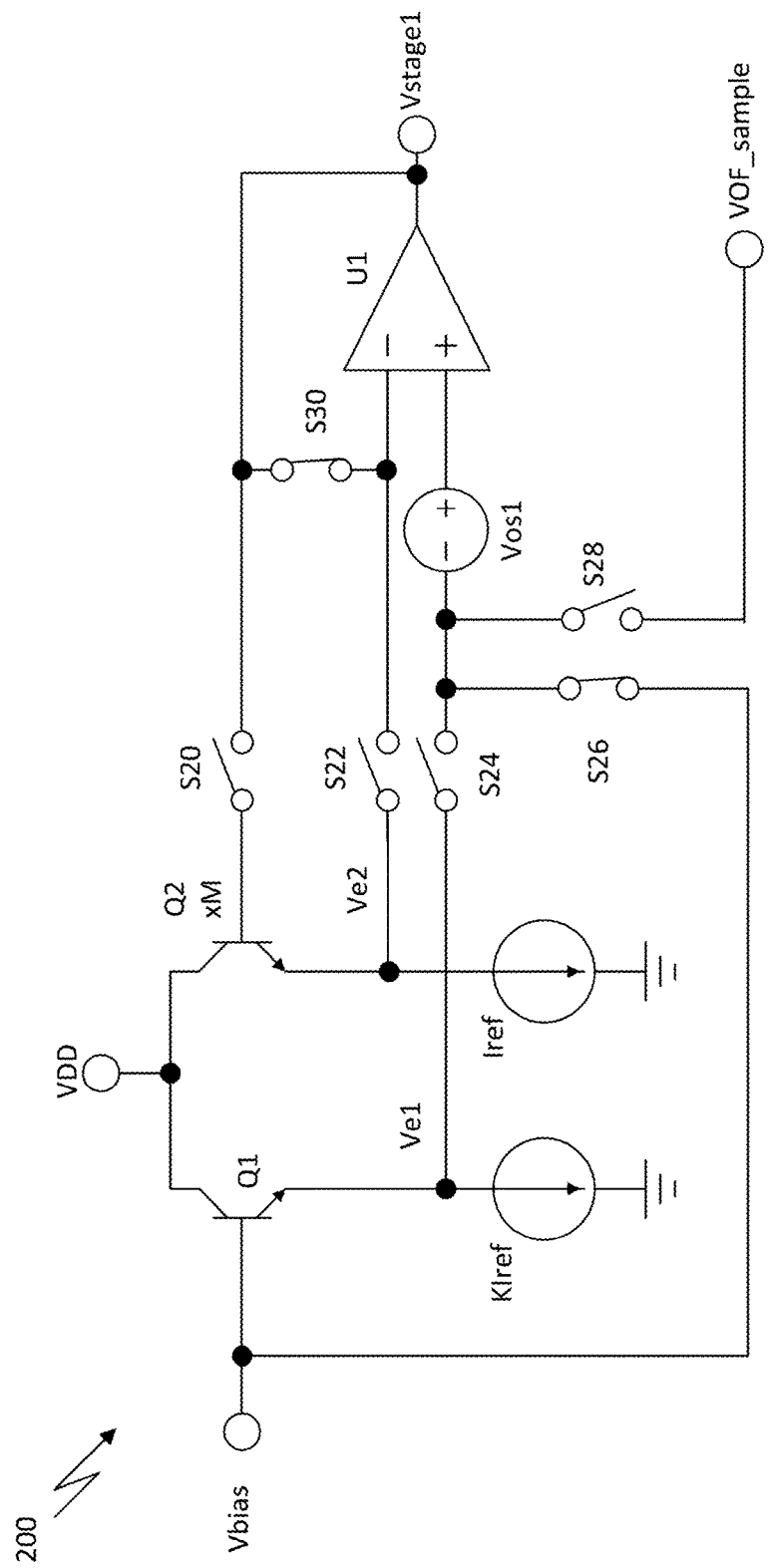
FIG. 8 is a schematic of the sensor stage of FIG. 2 with switches set to measure the offset of the sensor stage.

FIG. 8 shows the sensor stage 200 of FIG. 2 configured for offset measurement. Switches S20, S22, and S24 are opened to disconnect op-amp U1 from the transistors Q1 and Q2 and current sources $I_{ref}$ and $K_{Iref}$. Bias switch S26 is closed to connect the positive differential input of U1 to $V_{bias}$. Input switch S28 is closed to connect $V_{OF\_sample}$ to the positive differential input of op-amp U1. Feedback switch S30 is closed to set op-amp U1 in unity gain mode. The output voltage of op-amp U1 in the configuration of FIG. 8 is given by Equation 15.

$$V_{stage1} = V_{bias} + V_{os1} \qquad \text{Equation 15}$$

Referring to FIGS. 3-6, the voltage $V_{stage1}$ in Equation 15 may then be fed to the gain stage 300, sampled, and then integrated, e.g., N+1 times. The output voltage present on Vout after the Nth and N+1st cycle are sampled onto capacitors, e.g., C4.

Figure 9:
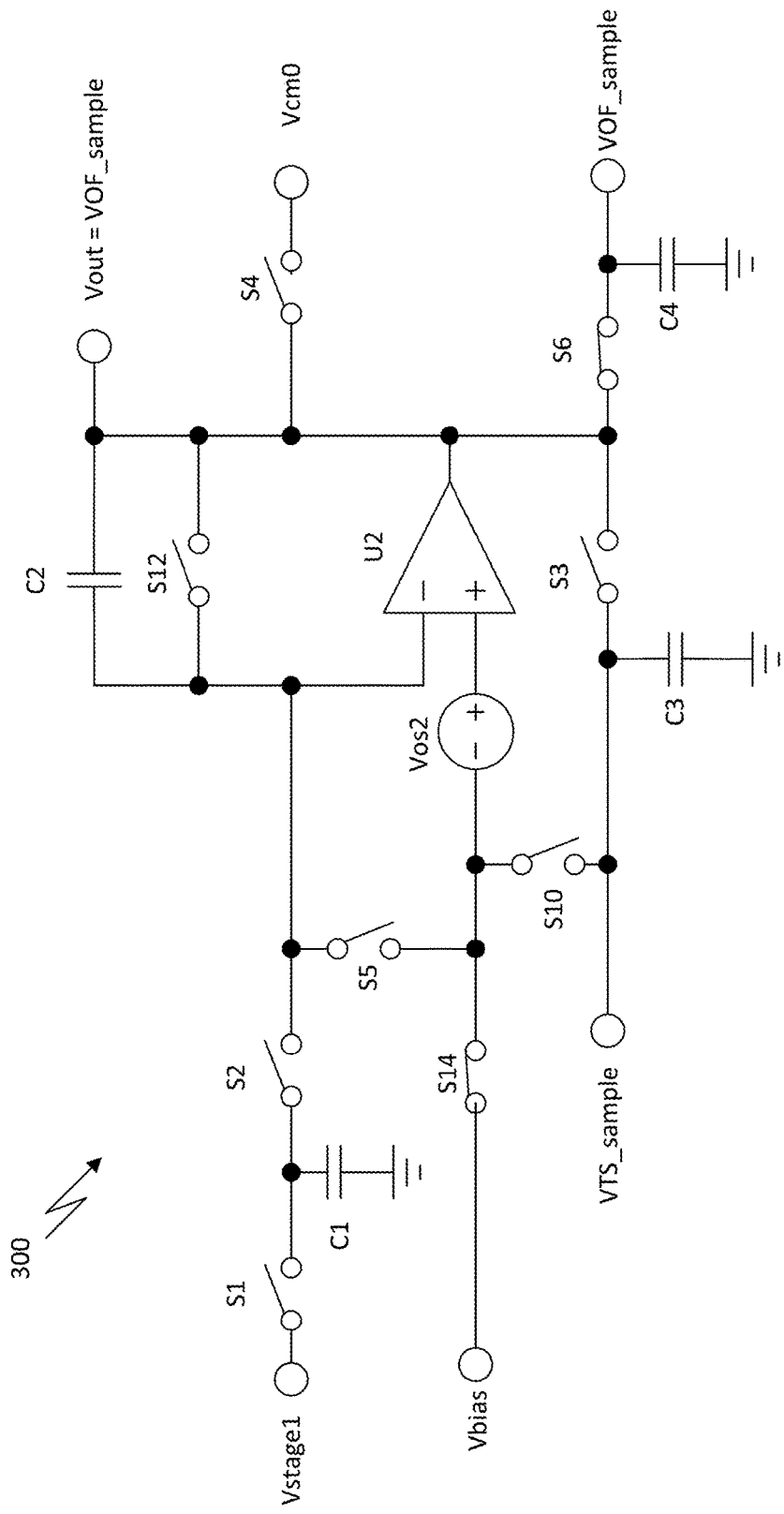
FIG. 9 is a schematic of the gain stage of FIG. 3 with switches set to hold the offset reading onto another capacitor.

FIG. 9 shows the gain stage 300 set to hold the offset measurement. Only hold switch S6 is closed, connecting output voltage $V_{out}$ to hold capacitor C4. This voltage, which results from the N+1$^{St}$ cycle of the gain stage 300, is referred to as $V_{OF\_Sample}$, and contains only the amplified offsets of both op-amps and the initial condition voltage, as given in Equation 16.

$$V_{OF_{SampleN}} = V_{out0} + \underbrace{N\frac{C_1}{C_2}(V_{OS2} - V_{OS1})}_{Offset} \qquad \text{Equation 16A}$$

$$V_{OF_{SampleN+1}} = V_{out0} + \underbrace{(N+1)\frac{C_1}{C_2}(V_{OS2} - V_{OS1})}_{Offset} \qquad \text{Equation 16B}$$

At this point, both voltages $V_{TS\_SAMPLE}$ and $V_{OF\_SAMPLE}$ are stored on capacitors C3 and C4 respectively. An offset-cancelled differential output voltage of the temperature sensor system may be derived by re-using op-amps U1 and U2 in unity gain feedback configurations to buffer $V_{TS\_SAMPLE}$ and $V_{OF\_SAMPLE}$.

Figure 10:
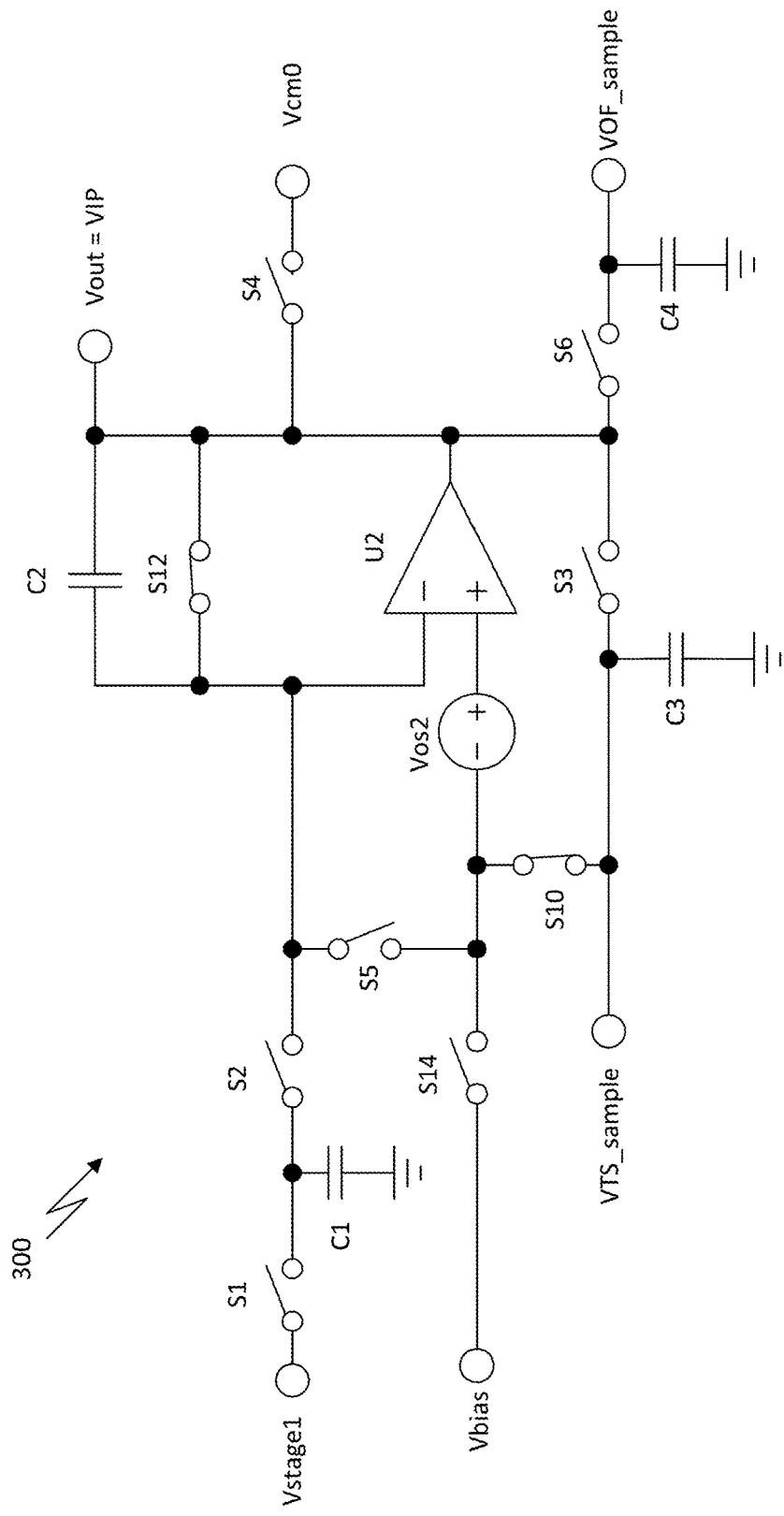
FIG. 10 is a schematic of the gain stage of FIG. 3 with switches set to buffer the temperature measurement reading.

FIG. 10 shows the gain stage 300 with switches set for temperature measurement buffering. Feedback switch S12 is closed to set op-amp U2 in unity gain mode. Input switch S10 is closed to connect C3 to the positive differential input of op-amp U2. In this configuration, the op-amp U2 output voltage $V_{out}$=VIP as given in Equation 17A.

$$VIP = V_{TS\_Sample} + V_{os2} \qquad \text{Equation 17A}$$

$$= V_{out0} + N\frac{C_1}{C_2}(V_{OS2} - V_{OS1}) +$$

$$N\frac{C_1}{C_2}\left(\frac{k}{q}\right)\ln(KM)T + V_{os2}$$

Figure 11:
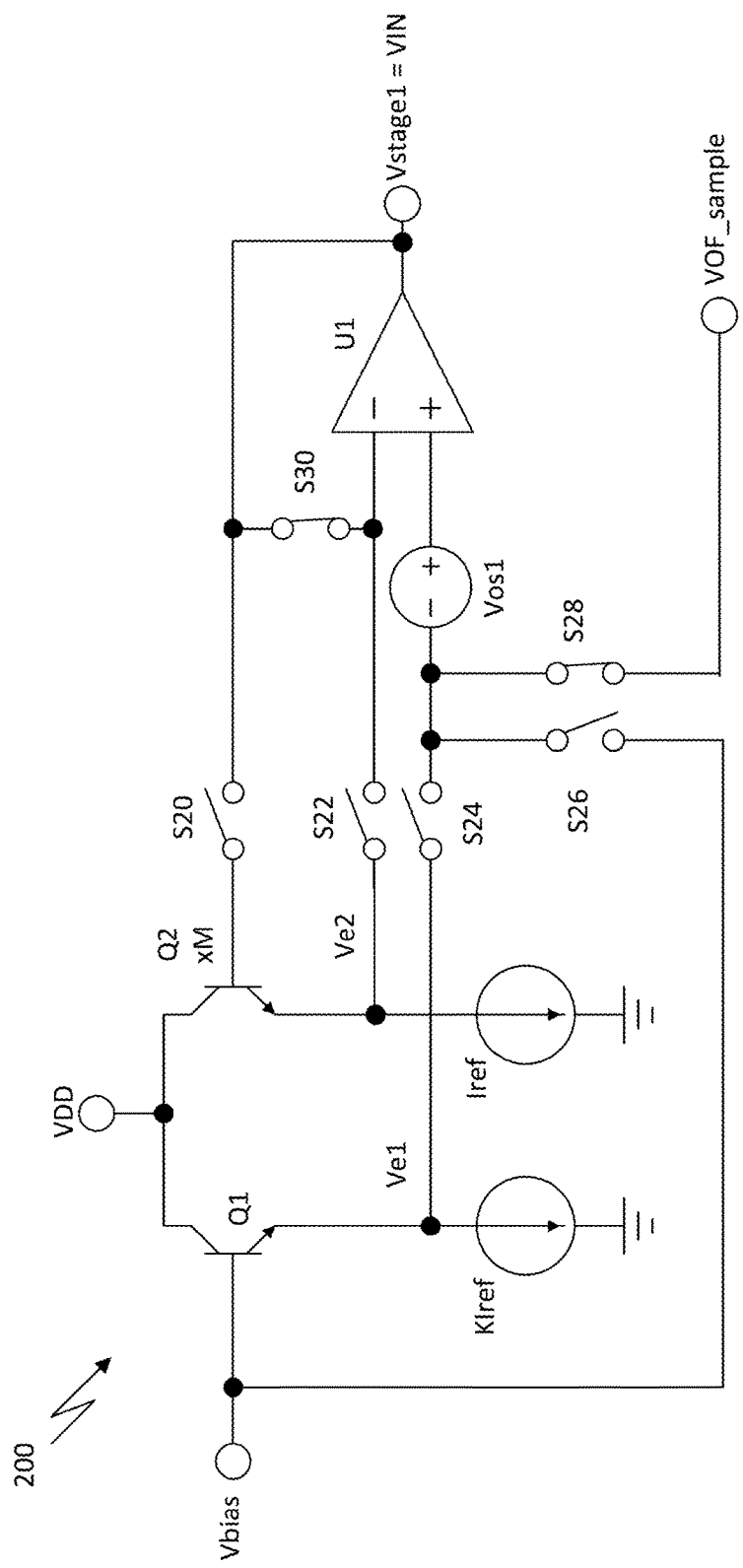
FIG. 11 is a schematic of the sensor stage of FIG. 2 with switches set to offset the temperature measurement reading.

FIG. 11 shows the sensor stage 200 with switches set for offset measurement buffering. As in FIG. 8, here in FIG. 11 switches S20, S22, and S24 are open to disconnect the op-amp U1 from the transistors and current sources, and feedback switch S30 is closed to set op-amp U1 in unity gain mode. Input switch S28 is closed to connect $V_{OF\_sample}$ to the positive differential input of op-amp U1. $V_{OF\_sample}$ is the voltage on C4, e.g., in FIGS. 9 and 10. In the configuration of FIG. 11, the op-amp U1 output voltage $V_{stage1}$=VIN is given in Equation 17B.

$$VIN = V_{OF_{SampleN+1}} + V_{os1} = \qquad \text{Equation 17B}$$

$$V_{out0} + (N+1)\frac{C_1}{C_2}(V_{OS2} - V_{OS1}) + V_{os1}$$

The differential voltage is obtained by subtracting VIN from VIP, as given in Equation 18. This may be accomplished, for example, by digitizing VIN and VIP at an analog-to-digital converter (ADC), and performing the subtraction digitally.

$$VIP - VIN = \qquad \text{Equation 18}$$

$$N\frac{C_1}{C_2}\left(\frac{k}{q}\right)\ln(KM)T + (V_{OS2} - V_{OS1})\left[N\frac{C_1}{C_2} + 1 - (N+1)\frac{C_1}{C_2}\right]$$

By sizing C1 and C2 in the gain stage 300 to be equal, the offset term in Equation 18 cancels. We are now left with a final differential output voltage, $V_{TS\_SYSTEM}$, independent of op-amp offsets.

$$V_{TS\_SYSTEM} = VIP - VIN = N\left(\frac{k}{q}\right)\ln(KM)T \quad \text{Equation 19}$$

The differential voltage $V_{TS\_SYSTEM}$ in Equation 19 only exhibits temperature dependency. $V_{TS\_SYSTEM}$ is scaled up by N, the number of integration cycles run in gain stage 300 to amplify the output of the sensor stage 200. $V_{TS\_SYSTEM}$ does not depend on the initial conditions applied on capacitor C2.

Figure 12:
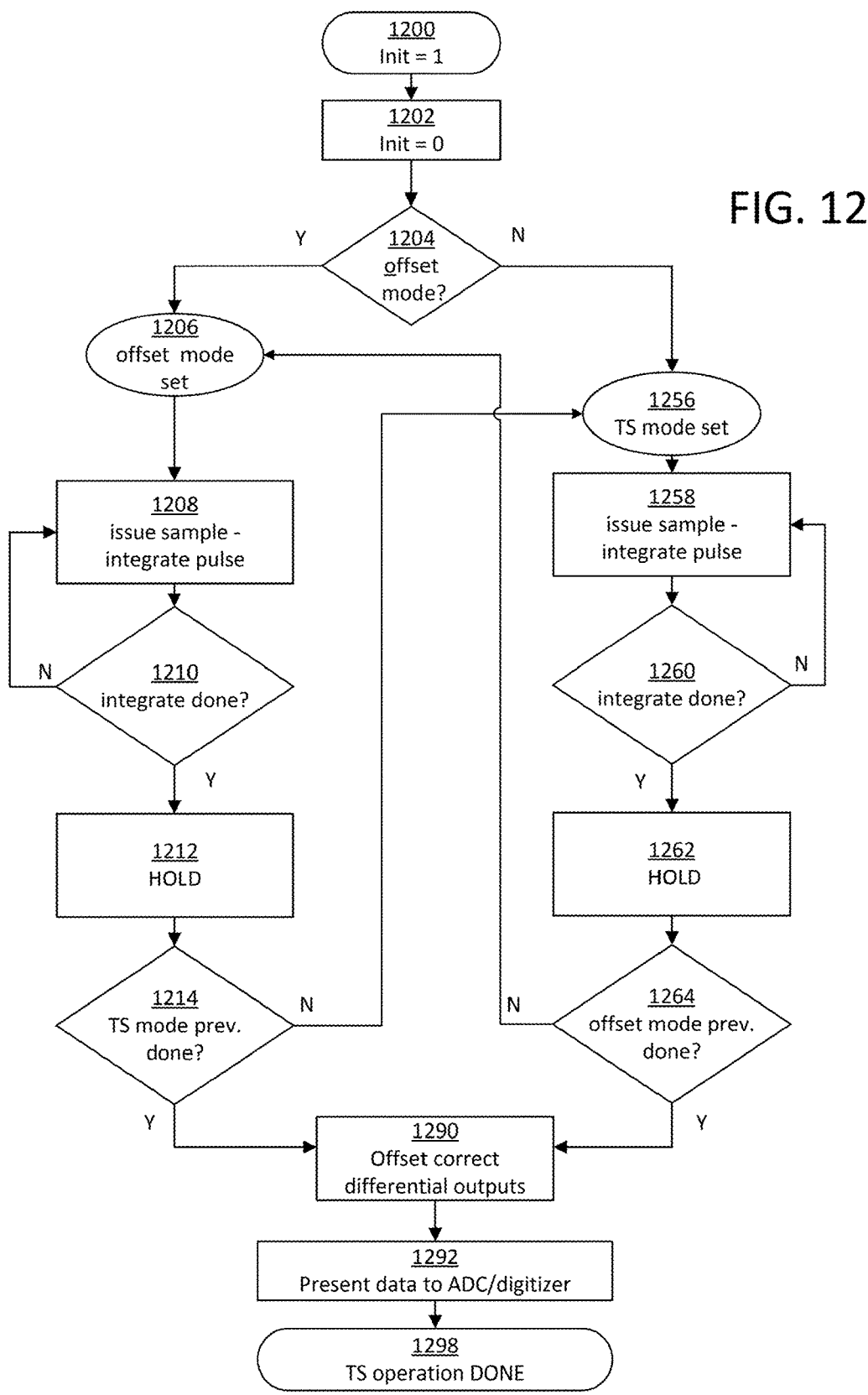
FIG. 12 is a flow chart of example operations of sensor and gain stages with various modes set by switches.

FIG. 12 is a flow chart of an example state machine implementing the measurement phases described herein. In step 1200, phase zero is implemented by turning on the clearing switches. In step 1202 the clearing switches are turned off. In step 1204, the system checks whether a cycle in offset mode is required. If so, the method continues to set the offset mode at step 1206. In step 1208, switches are set for offset measurement of op-amp U1, then a sample is taken, and integration is begun. In step 1210, the number of integration iterations is complete. If not, integration is repeated. In step 1212, the output of the integration is switched on the offset hold capacitor C4. In step 1214, the system then checks whether it is time to conduct a temperature sampling (TS) cycle.

If so, the method moves to set the TS mode at step 1256. In step 1258, switches are set for the temperature sensing configuration shown in FIG. 2, then a sample is taken, and integration is begun. In step 1260, the method checks if the number of integration iterations is complete. If not, integration is repeated. In step 1262, the output of the integration is switched on the temperature hold capacitor C3. In step 1264, the system then checks whether it is time to conduct an offset calibration.

Once both $V_{TS\_SAMPLE}$ and $V_{OF\_SAMPLE}$ are available on C3 and C4 respectively, the method proceeds to step 1290. The system corrects the input referred offsets of both op-amps on the differential output. In step 1292, the differential output voltage in Equation 19 is ready to be, e.g., read out through an analog multiplexer or presented to an ADC to digitize the result. The TS operation is completed at step 1298.

It will be appreciated that the structures and techniques described herein may be applied to other types of transducers. A system including a non-translinear differential temperature sensor, pressure sensor, strain sensor, gyroscope, magnetometer, accelerometer, or xyz positioning sensor, for example, may be formed through the substitution of other analog components in place of Q1, Q2, $KI_{ref}$, and $I_{ref}$ of FIG. 2. To do so, the switches S20, S22, S24, S26, S28, and S30 may be manipulated as described in reference to FIGS. 2, 8, 11, and 12 to the various transducer measurements, offset measurements, and buffering modes described herein, for example.

Voltages stored on C3 and C4, along with reconfiguration of the trans-linear stage and the switched capacitor amplifier, may be used to generate a ZTAT voltage reference. In order to do this, the PTAT voltage needs to be compensated with a complementary-to-absolute temperature (CTAT) voltage.

The trans-linear circuit of FIG. 2 generates a CTAT signal Vbe1. The emitter voltage for NPN transistor Q1, which may be used in further computations, is derived as follows.

$$V_{e1} = V_{CTAT} = V_{bias} - V_{be1} \quad \text{Equation 20}$$

$V_{be1}$ has a negative voltage coefficient based on the properties of the forward voltage of pn-junction diodes.

Figure 13:
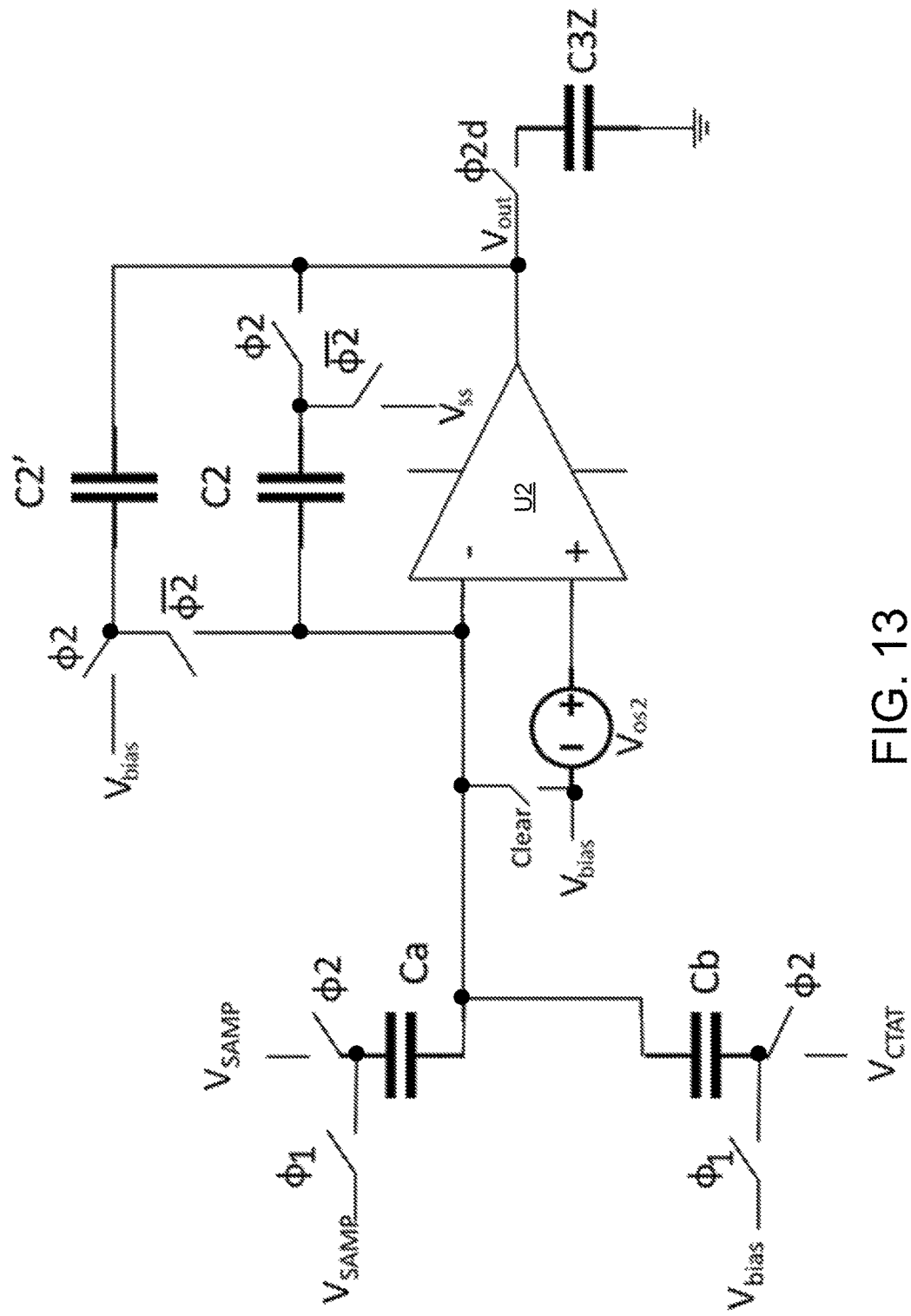
FIG. 13 shows an example switched capacitor amplifier configured to perform a ZTAT measurement.
Figure 14:
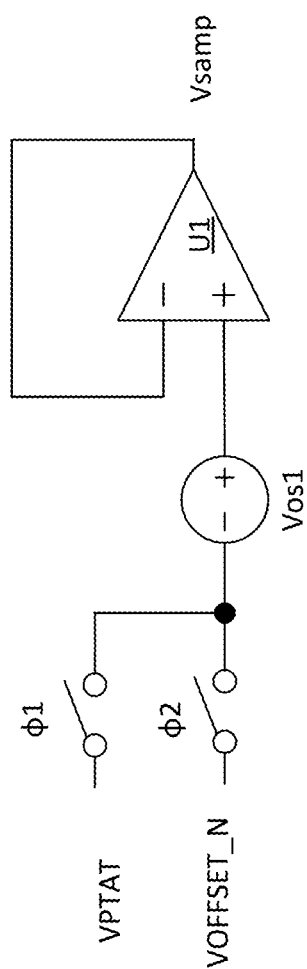
FIG. 14 shows an example buffer amplifier configured to perform a ZTAT measurement.

A switched capacitor amplifier, such as the amplifier of FIG. 3, may be reconfigured as shown in FIG. 13. Here in FIG. 13, $V_{SAMP}$ is the output voltage of the unused op-amp U1 (with offset $V_{OS1}$), with in a unity gain configuration as shown in FIG. 14. The input is either connected to $V_{PTAT}$ or $V_{OFFSET\_N}$ (derived in Equations 14 and 16) depending on the phase of operation. The phases of operation to generate the ZTAT voltage are shown in the timing diagram of FIG. 4.

A clear phase may be used to short inputs of amplifiers. A clear phase may also be used to connect the negative input to the output for the amplifier in FIG. 13 such that the output capacitor will always be charged to the same point (Vbias) at the beginning of ZTAT operation. This is not absolutely necessary but it reduces variability in the output node which affects the time it takes the output to converge on its final value.

In the temperature compensation phase, indicated by control signal φ1, the PTAT voltage and $V_{bias}$ are sampled on capacitors Ca and Cb. The charges on Ca, Cb, and C2 at the end of this phase is given by the following equations:

$$Q_a = C_a(V_{bias} + V_{os2} - (V_{PTAT} + V_{os1})) \quad \text{Equation 21A}$$

$$Q_b = C_b(V_{bias} + V_{os2} - V_{bias}) \quad \text{Equation 21B}$$

$$Q_2 = C_2(V_{bias} + V_{os2}) \quad \text{Equation 21C}$$

The PTAT voltage includes the offset of the op-amp U1.

In the offset cancellation phase, indicated by control signal φ2, the offset only voltage $V_{OFFSET\_N}$ and $V_{CTAT}$ are sampled on Ca and Cb. The charges on Ca, Cb, and C2 at the end of this phase is given by the equations below:

$$Q_a = C_a(V_{bias} + V_{os2} - (V_{OFFSET+N} + V_{os1})) \quad \text{Equation 22A}$$

$$Q_b = C_b(V_{bias} + V_{os2} - V_{CTAT}) \quad \text{Equation 22B}$$

$$Q_2 = C_2(V_{bias} + V_{os2} - V_{out}) \quad \text{Equation 22C}$$

Capacitor $C_2'$ must be sized large enough to resist high frequency variation in the output voltage due to switching feedback loops. Other than that this capacitor does not directly affect the charge conservation equations at the input node.

The charge difference between φ1 and φ2 appears at the output of the amplifier. From charge conservation, the charges on all three capacitors in both phases must be equal.

$$\begin{aligned} &C_a(V_{bias} + V_{os2} - (V_{PTAT} + V_{os1})) + \\ &\quad C_b(V_{bias} + V_{os2} - V_{bias}) + C_2(V_{bias} + V_{os2}) = \\ &C_a(V_{bias} + V_{os2} - (V_{OFFSET+N} + V_{os1})) + \\ &\quad C_b(V_{bias} + V_{os2} - V_{CTAT}) + C_2(V_{bias} + V_{os2} - V_{out}) \end{aligned} \quad \text{Equation 23}$$

Vout can be written as a ratio-metric difference of the input voltages:

$$V_{out} = \frac{C_a}{C_2}(V_{PTAT} - V_{OFFSET+N}) + \frac{C_b}{C_2}(V_{bias} - V_{CTAT}) \quad \text{Equation 24A}$$

$$V_{out} = \quad \text{Equation 24A}$$
$$\frac{C_a}{C_2}\left(V_{bias} + N\frac{C_1}{C_2}(V_{os2} - V_{os1}) + N\frac{C_1}{C_2}V_T\ln(KM) - V_{bias} - N\frac{C_1}{C_2}(V_{os2} - V_{os1})\right) + \frac{C_b}{C_2}(V_{bias} - V_{bias} + V_{be1})$$

At phase φ2d, Vout is sampled onto C3Z as a ZTAT voltage reference. Simplifying Equation 4 gives us the ZTAT reference:

$$V_{out} = \frac{C_a}{C_2}\left(N\frac{C_1}{C_2}V_T\ln(KM)\right) + \frac{C_b}{C_2}V_{be1} \qquad \text{Equation 25}$$

$C_1$, $C_2$, and $C_3$ from the PTAT mode can be reused for $C_a$, $C_b$, $C_2$, and $C_2'$ depending on the necessary ratios for PTAT to CTAT voltages. By adjusting capacitor ratios, the PTAT effects with CTAT may be compensated to yield a ZTAT voltage reference.

Another application for the ZTAT voltage reference is for single point calibration to account for the offset contribution of an ADC. Since the ZTAT voltage and the LSB of the ADC are known the ADC output reading for the ZTAT can be used to determine the offset of the ADC. The ZTAT voltage reference is also insensitive to temperature so the calibration temperature does not need to be precisely controlled, which makes this a significantly simpler calibration than is needed for the PTAT alone. To determine this offset the actual ADC code is simply subtracted from the expected code to give the ADC offset in bits.

$$\text{ADC Code}_{actual} - \text{ADC Code}_{Expected} = \text{ADC code}_{offset} \qquad \text{Equation 26}$$

Using the calculated offset from Equation 26, the correct ADC code for the PTAT may be found by subtracting this ADC offset from the uncalibrated ADC output for the PTAT voltage.

Figure 15:
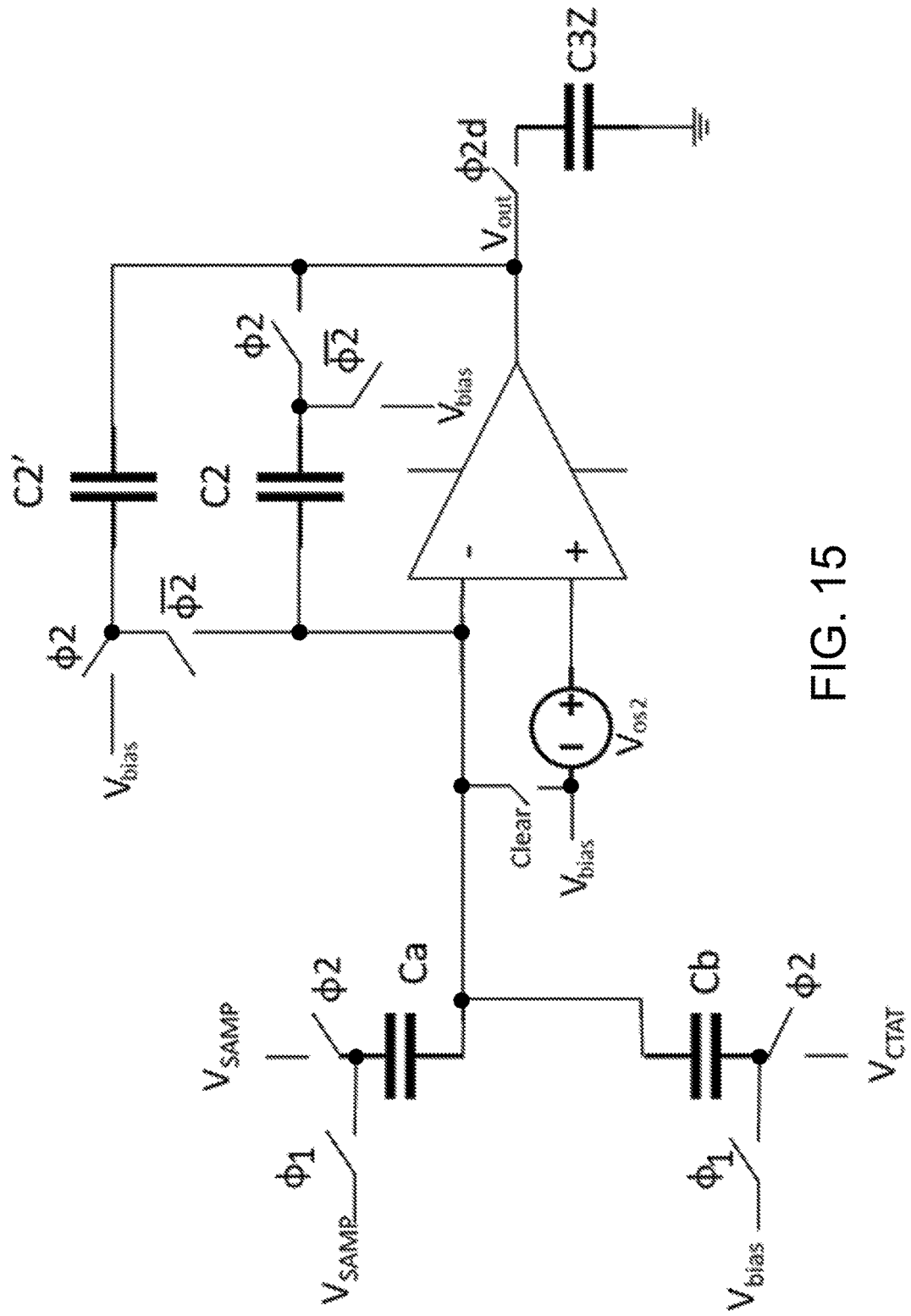
FIG. 15 shows an example switched capacitor amplifier configured to perform a ZTAT measurement in an alternate configuration.

There are two methodologies for obtaining the ADC code for the ZTAT signal. Both techniques involve replacing Vss in FIG. 13 to obtain an additional Vbias term in the ZTAT output, as shown in FIG. 15. Adding this Vbias changes the charge stored on Q2 during the first phase of operation which results in the following Vout:

$$V_{out} = \frac{C_a}{C_2}\left(N\frac{C_1}{C_2}V_T\ln(KM)\right) + \frac{C_b}{C_2}V_{be1} + V_{bias} \qquad \text{Equation 27}$$

If Vout from Equation 27 is input into the positive input terminal of the ADC and Vbias is input into the negative input terminal then only the ZTAT signal with any added offset term from the ADC will remain.

If the output for the ZTAT generator is sampled onto a capacitor and must be buffered before being input into the ADC this can be achieved using the same PTAT signal and the original (N+1) offset signal from the PTAT operation where an extra offset sample is taken. Just as is the case with the original PTAT sensor the extra offset sample allows for buffering of the final two signals while still cancelling the offset. In this case the ZTAT sample would be buffered by op-amp U2 and the Vbias would be buffered by op-amp U1. The input voltages to the positive and negative terminals of the ADC are shown in Equations 28A and 28B.

$$VIP = V_{ZTAT\_Sample} + V_{os1} \qquad \text{Equation 28A}$$
$$= \frac{C_a}{C_2}\left(N\frac{C_1}{C_2}V_T\ln(KM)\right) + \frac{C_b}{C_2}V_{be1} + V_{bias} +$$
$$\frac{C_aC_1}{C_2^2}(V_{os2} - V_{os1}) + V_{os1}$$

$$VIN = V_{bias} + V_{os2} \qquad \text{Equation 28B}$$

To cancel offsets the ratio of $C_aC_1$ over $C_2^2$ must equal one, which can constrain the design. Instead a different capacitor, say $C_a'$, may be used for the N+1 sample of the offset, this allows for more freedom in choosing capacitor ratios while still cancelling the offsets introduced by the necessity to buffer the voltages.

The sensor stage 200 and gain stage 300 as described herein has been simulated as being fabricated in a TSMC 65 nm LP CMOS process. FIGS. 16-20 are graphs of simulated performance of an example circuit.

Figure 16:
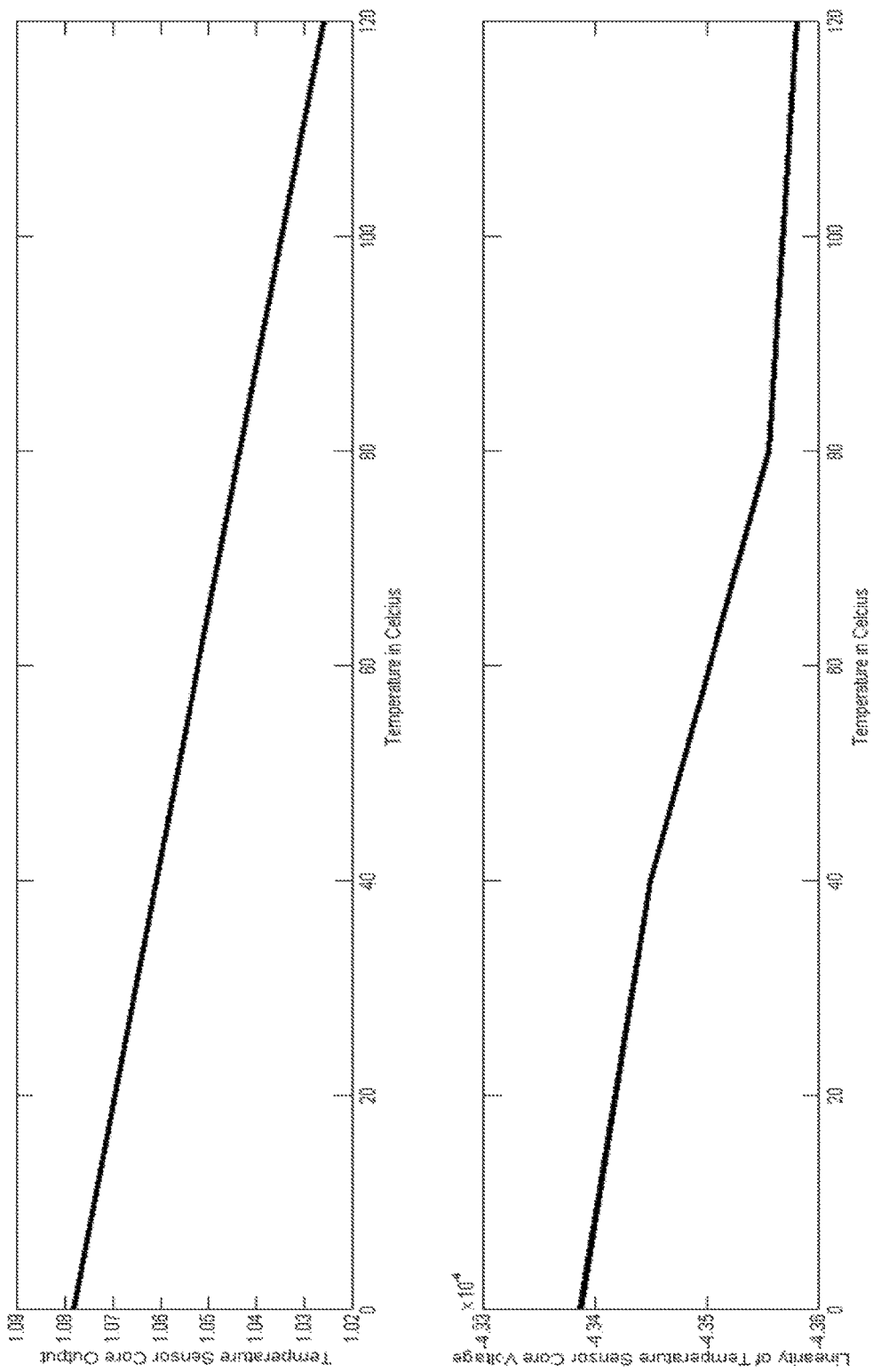
FIG. 16 shows an example output of a temperature sensor stage and its linearity.

At the top of FIG. 16 is an example output of a sensor stage 200 in temperature measurement mode. The vertical axis is voltage, and the horizontal axis is temperature. The output essentially maintains its linearity over a range of temperature range from 0° C. to 120° C. At the bottom of FIG. 16 is the linearity of the output using the same horizontal axis. The vertical axis is the change in the output per degree of temperature.

Figure 17:
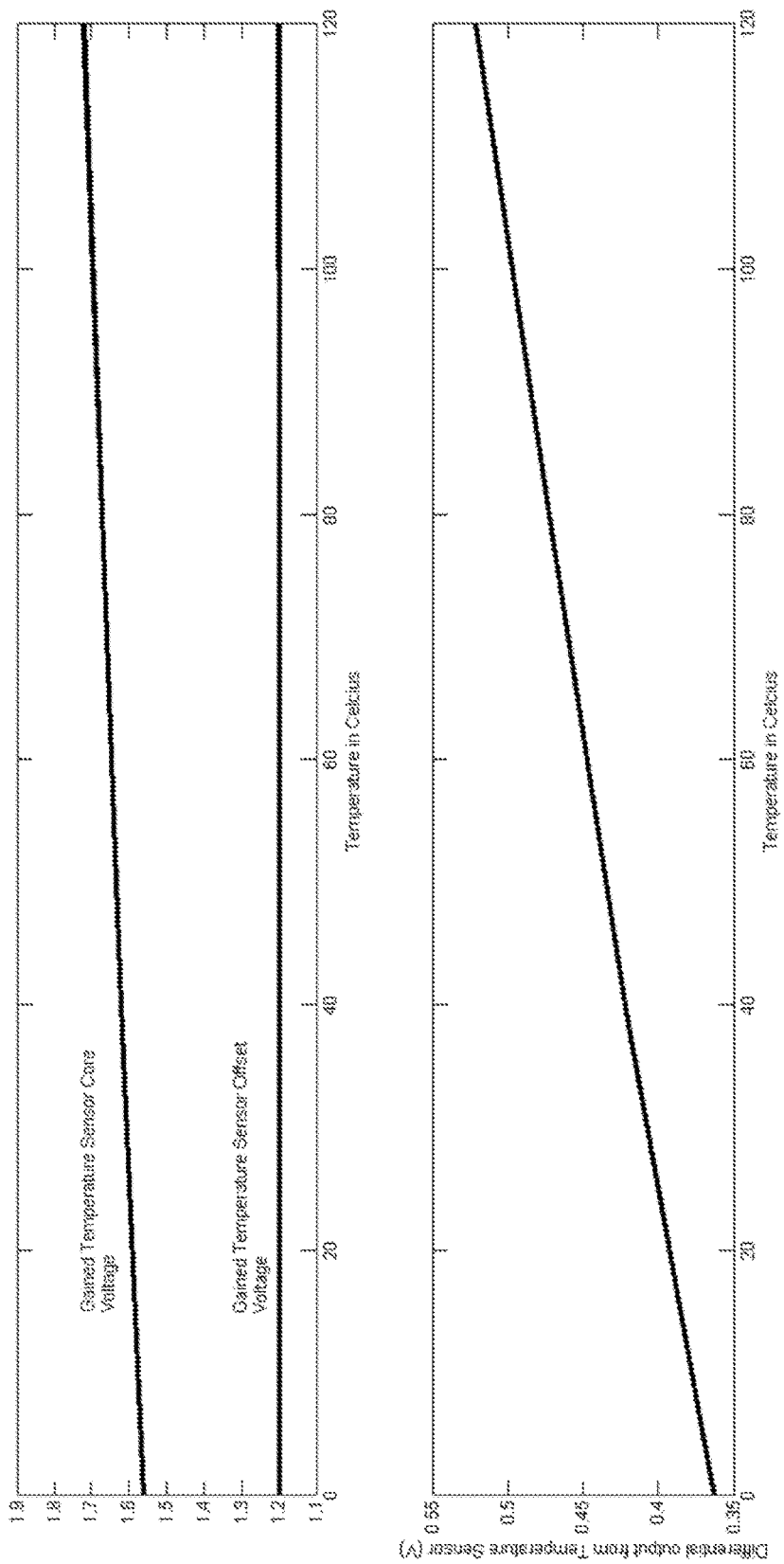
FIG. 17 shows the components of an example differential output, including a temperature measurement and an offset measurement output, both after a gain stage, and the combined differential output.

At the top of FIG. 17 is an example of the temperature measurement $V_{TS\_Sample}$ and offset measurement $V_{OS\_Sample}$ voltages produced by the gain stage 300. The vertical axis is voltage and the horizontal axis is temperature. At the bottom of FIG. 17 is an example of the differential output of the system $V_{TS\_SYSTEM}$, again with voltage in the vertical and temperature in the horizontal. This bottom curve is an example of the differential input to an analog-to-digital converter (ADC), again with voltage in the vertical and temperature in the horizontal.

Figure 18:
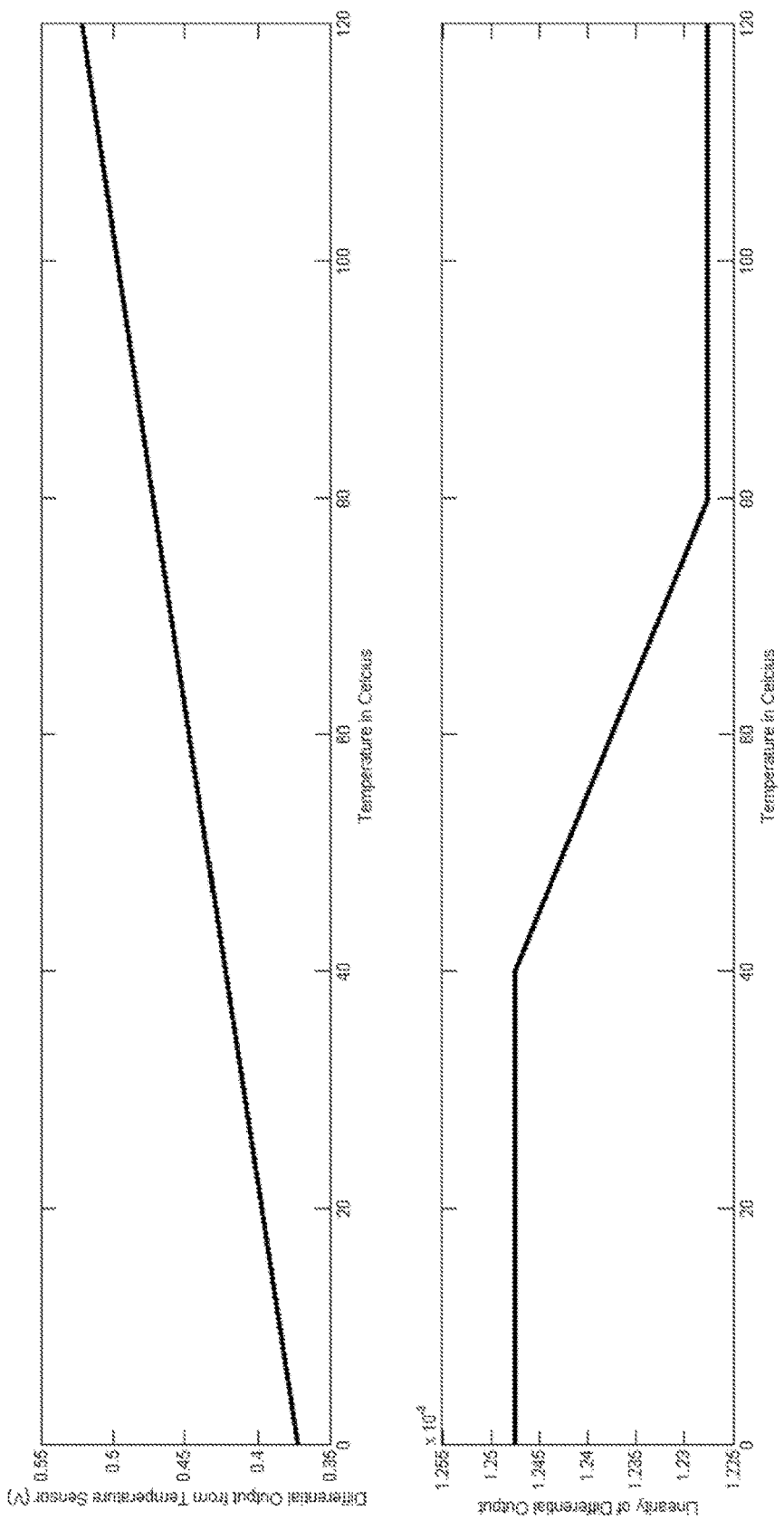
FIG. 18 shows an example offset-adjusted output and its linearity.

At the top of FIG. 18 is again the example of the differential output of the system $V_{TS\_SYSTEM}$, shown again with voltage in the vertical and temperature in the horizontal. At the bottom of FIG. 18 is the linearity of $V_{TS\_SYSTEM}$. Again, the system maintains linearity over a large temperature range.

Figure 19:
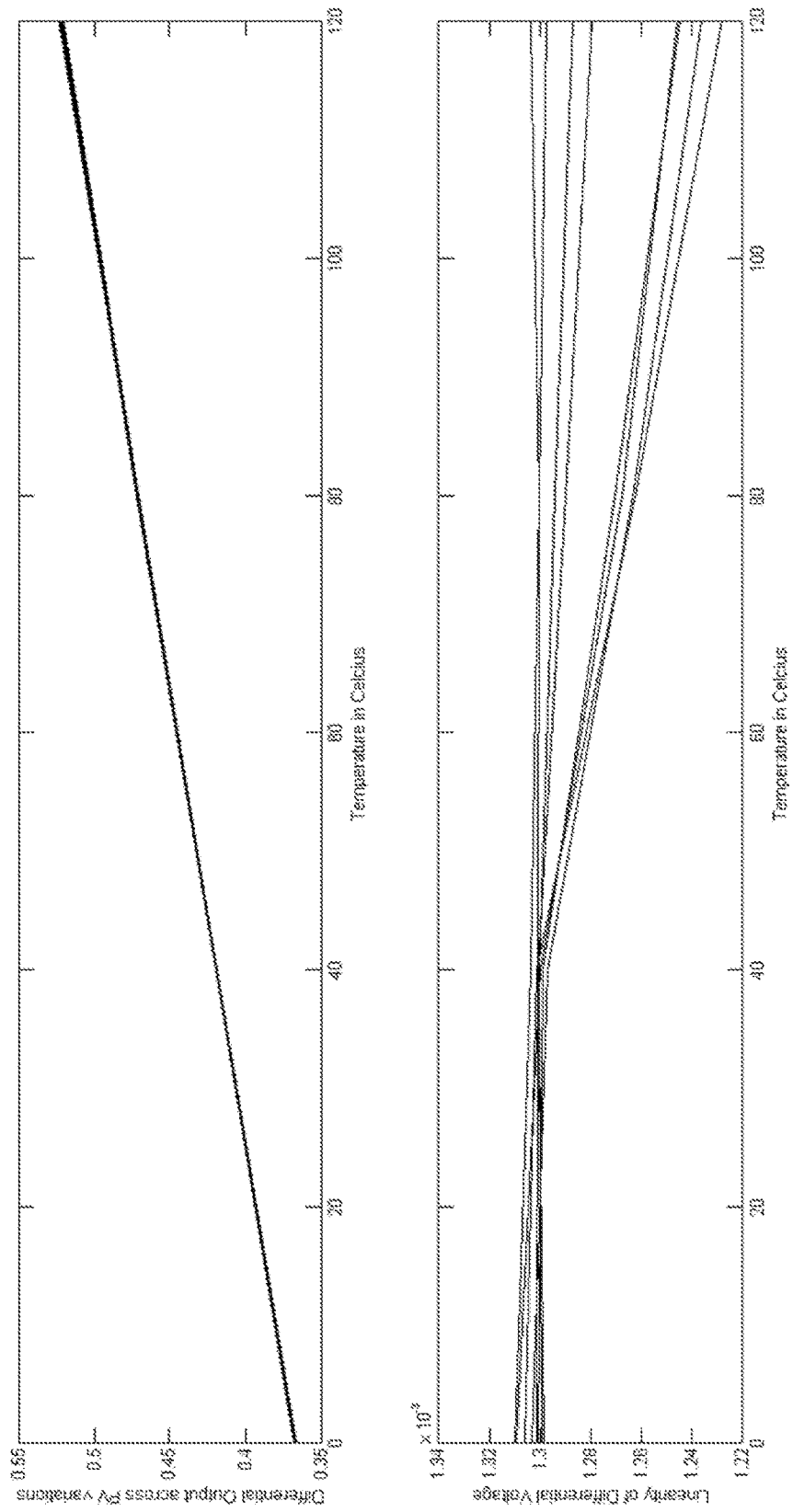
FIG. 19 shows an example final output and its linearity for simulated process and operating condition variations.

FIG. 19 shows the performance of the temperature sensor over a variety of process and operating conditions. At the top of FIG. 19 are overlaid curves of $V_{TS\_SYSTEM}$ across various conditions. At the bottom of FIG. 19, are overlaid curves of the linearity of $V_{TS\_SYSTEM}$ across various conditions. In all cases, the differential output values drift very slightly from each other with a maximum error of ±1 mV.

Figure 20:
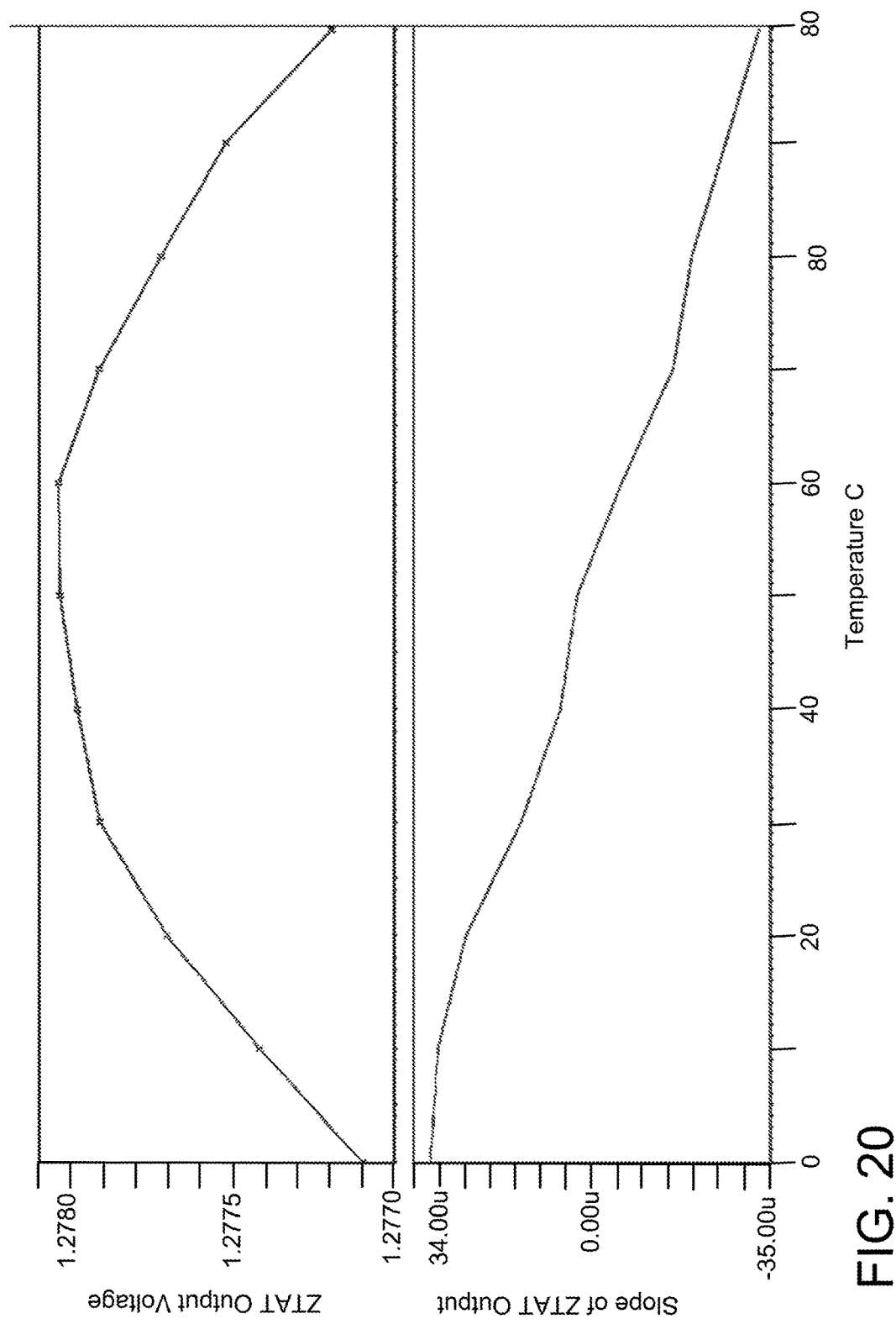
FIG. 20 shows the performance of an example ZTAT voltage reference signal over temperature.

FIG. 20 shows an example simulation of a ZTAT reference voltage output versus temperature. The curvature of the ZTAT voltage has a drift of ±500 μV.

With an input referred offset of ±10 mV on each op-amp, the maximum variation on the differential output is simulated to be 260 μV. This represents an expected 40× reduction in system offset voltage compared to the configuration of FIG. 1. The maximum variation of the ZTAT voltage shows similar offset reduction.

Monte Carlo simulations on the temperature sensor system result in a 1σ variation of 1.54 μV/° C. in the slope of the differential output. To put this number in perspective for production systems, with a 5σ accuracy, a 12-bit ADC will drift by 1 LSB every 33° C. The ZTAT reference voltage has a 1σ variation of 30 μV on its curvature and sets the floor of the accuracy of the system.

Both the PTAT and ZTAT measurements are therefore highly accurate across various process, environmental, and offset conditions. The system maintains high linearity over a wide temperature range, making it suitable for a variety of applications demanding precise temperature readings and sensitivity.

The structures and techniques described herein may be combined in a number of ways to perform transducer and offset measurements. For example, transducer and offset measurements may be derived by first sampling a first output of a first amplifier, where the first amplifier is set in a measurement feedback mode, to create a measurement sample, then integrating the measurement sample using a second amplifier, where the second amplifier is set in a switched capacitor mode, to create a measurement output voltage, and holding the measurement output voltage on a first holding capacitor. Then a second output of the first amplifier may be sampled, where the first amplifier is set in a first buffering mode, to create an offset sample, then integrating the offset sample using the second amplifier in the switched capacitor mode to create an offset output voltage, and then holding the offset output voltage on a second holding capacitor. Finally, the measurement output voltage on the first holding capacitor may be buffered using the second amplifier, where the second amplifier is set in a second buffering mode, to create a final buffered measurement voltage, and the offset output on the second holding capacitor may be buffered using the first amplifier, where the first amplifier is set in a third buffering mode, to create a final buffered offset voltage.

This technique may be enhanced by amplifying the measurement sample or the offset sample by iterating the integration of the second amplifier in the switched capacitor mode. The technique may also be improved where the second amplifier has a differential input comprising a positive input and a negative input, where the second amplifier is set in switched capacitor mode, the positive input is connected to a reference voltage, the negative input is connected to a sampling capacitor, and the output of the second amplifier is connected to negative input by an integrating capacitor, and where the sampling capacitor and the integrating capacitor are of the same value.

These techniques may be used to derive a measurement sample using a transducer circuit, where the transducer circuit comprises the first amplifier in the measurement feedback mode. The transducer may be a translinear PTAT such as described in reference to FIG. 2. The transducer may also be implemented with many other forms of sensors, such as differential temperature sensors including proportional-to-absolute-temperature sensors, and also pressure sensors, strain sensors, gyroscopes, magnetometers, accelerometers, and xyz positioning sensors.

The technique may further include subtracting the final buffered offset output voltage from the final buffered measurement output voltage to derive an offset-adjusted measurement output. The subtraction may be achieved by analog or digital means.

The transducer measurement, offset measurement, and offset-adjusted measurement output may be used to calibrate any kind of temperature sensitive equipment. Such equipment may include image sensors including, for example, depth ranging imagers such as a time-of-flight cameras.

Figure 21:
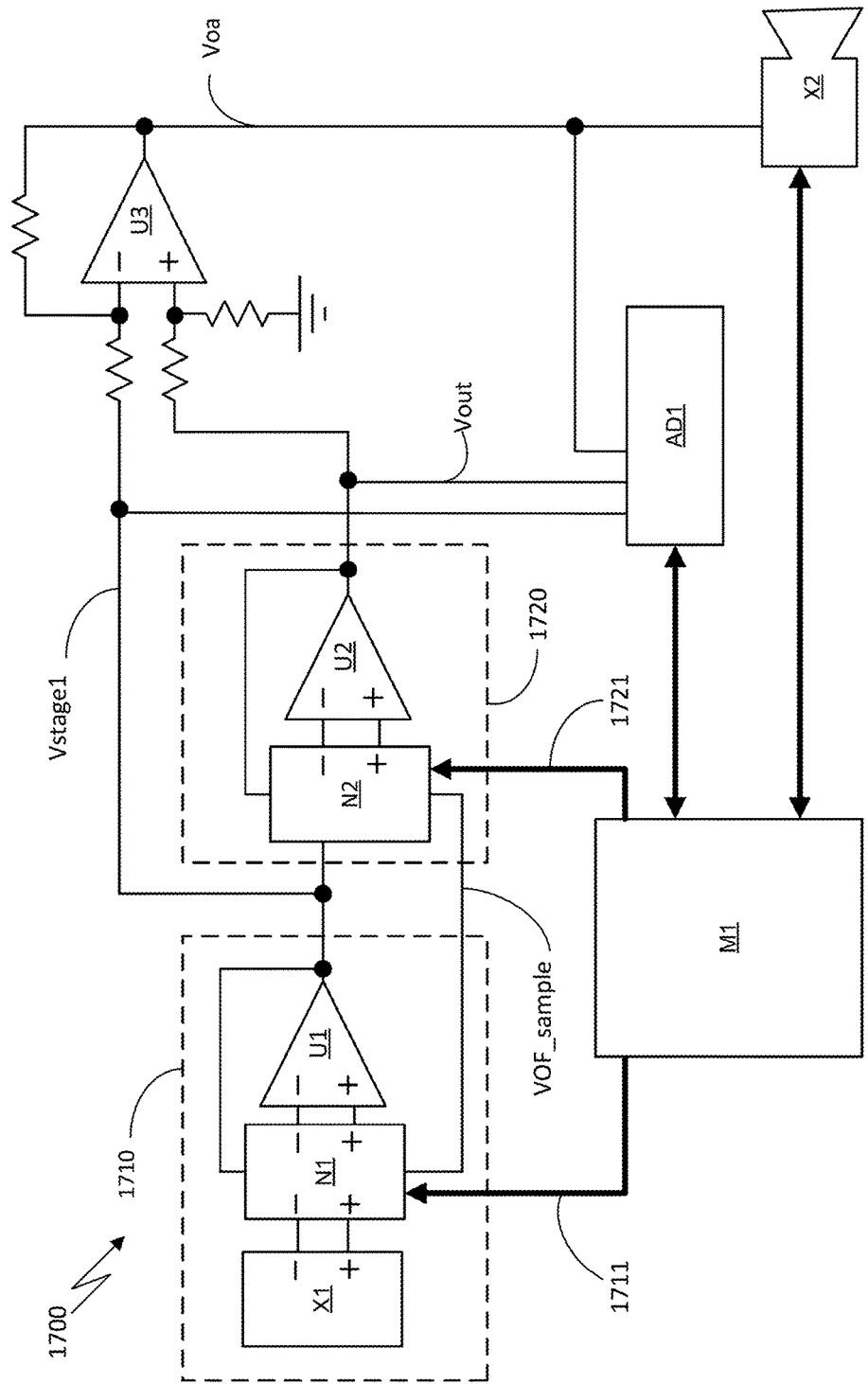
FIG. 21 shows a system including a transducer and amplifiers, and a sensor calibrated by the transducer measurement.

The structures and techniques described herein may be combined in a number of ways to create transducer measurement devices. FIG. 21 illustrates an example system 1700 including a sensor stage 1710, a gain stage 1720, an output amplifier U3, a digital state machine M1, an analog-to-digital converter AD1, and sensor X2. Sensor stage 1710 may be a PTAT sensor stage as described in reference to FIGS. 2, 8, and 11. Sensor stage 1710 includes a differential transducer X1, a switch and passive component network N1, and a first amplifier U1. Operation of network N1 is controlled by signals 1711 from the digital state machine M1.

Digital state machine M1 may include a microprocessor, a microcontroller, a field-programmable logic device, or other digital circuitry implementing the control of switches of amplifiers modes as described, e.g., in reference to FIGS. 2, 3, and 5-12.

The output of sensor stage 1710, $V_{stage1}$, feeds into the gain stage 1720. Gain stage 1720 may be configured as described in reference to FIGS. 3, 5, 6, 7, 9, and 10. It contains a switch and passive component network N2 and a second amplifier U2. Operation of network N2 is controlled by signals 1721 from the digital state machine M1, as described, e.g., in reference to FIGS. 2, 3, and 5-12.

Via operation of the networks N1 and N2, digital state machine M1 causes outputs proportional to the output of the transducer X1 and the offsets of U1 and U2 to be available to other devices. The offset value may be subtracted from the transducer measurement by analog means using a third differential amplifier U3, albeit with the risk of introducing an error due to the offset of amplifier U3. Alternatively, the differential output, consisting of the buffered offset measurement and the buffered transducer measurement may be used directly to calibrate a sensor such as an image sensor.

The output from the amplifier U3, offset-adjusted voltage $V_{oa}$, may then be used to calibrate a sensor X2. For example, sensor X2 may be a time-of-flight depth camera, the output of which may vary with temperature. Transducer X1 may be a temperature sensor such as a translinear PTAT. The temperate measurement as adjusted for offset of the measure system $V_{oa}$ may be used to adjust the output of sensor X2 according to the measured temperature.

Alternatively, the final transducer and offset measurement outputs of the sensor stage 1710 and the gain stage 1720 may be digitized at a time designated by the digital state machine M1 by the analog-to-digital converter AD1. The determination of the offset-adjusted transducer measurement may then be achieved by digital subtraction via the digital state machine M1. Digital state machine M1 may additionally perform adjustment of the output of sensor X2 based on the digitized offset-adjusted measurement of the transducer X1.

For economy and matching of environmental conditions, it may be advantageous to fabricate all the components of system 1700 monolithically. For example, where transducer X1 is a temperature sensor, and sensor X2 is an image sensor, having both devices on the same substrate helps to insure that the temperature measured by the transducer X1 is the temperature experienced by the image sensor X2.

For example, a measurement system may include two amplifiers, where each amplifier has multiple configurable modes. The modes of the first amplifier may include a measurement feedback mode, an offset sampling mode, and an offset buffering mode. The modes of the second amplifier may include an input sampling mode, an integration mode, a measurement output hold mode, an offset output hold mode, and a measurement buffering mode.

A digital state machine may be configured to manipulate the modes of the first and second amplifiers in controlled sequences. A first sequence may include setting the first amplifier in the measurement feedback mode, then setting the second amplifier to the input sampling mode, the integration mode, and the measurement output hold mode in turn. The second sequence may include setting the first amplifier in the offset sampling mode, then setting the second amplifier to the input sampling mode, the integration mode, and offset output hold mode in turn. A third sequence may include setting the first amplifier to the offset buffering mode and setting the second amplifier to the measurement buffering mode.

The system may be improved by, in the first and second sequences, iterating the sampling and integration modes of the second amplifier to achieve switched capacitor amplification.

The system may also be improved where the second amplifier has a differential input comprising a positive input and a negative input, where the second amplifier is set in switched capacitor mode, the positive input is connected to a reference voltage, the negative input is connected to a sampling capacitor, and the output of the second amplifier is connected to negative input by an integrating capacitor, where the sampling capacitor and the integrating capacitor are of the same value.

The system may include a transducer circuit, where the transducer circuit comprises the first amplifier in the measurement feedback mode. The transducer circuit may be a differential temperature sensor such as a proportional-to-absolute-temperature sensor. The transducer may be a translinear PTAT such as described in reference to FIG. 2. The transducer circuit may also be a non-translinear differential temperature sensor, pressure sensor, strain sensor, gyroscope, magnetometer, accelerometer, or xyz positioning sensor.

The system may also include a third amplifier, where the third amplifier is configured to subtract the output of the first amplifier from the output of the second amplifier during the third sequence. Similarly, the third sequence may include triggering the digitizing of output voltages of the first and second amplifier and the digital subtraction of the voltages. The transducer measurement, offset measurement, and offset-adjusted measurement output may be used to calibrate any kind of temperature sensitive equipment. Such equipment may include image sensors including, for example, depth ranging imagers such as a time-of-flight cameras.

We claim:

1. A reference circuit, comprising:
   a first transistor, the first transistor being connected between a power source and a first current reference to produce a proportional-to-absolute-temperature voltage at the connection of the first transistor and the first current reference;
   a bias voltage reference, the bias voltage reference being connected to a base of the first transistor;
   a second transistor, the second transistor being connected between the power source and a second current reference; and
   a differential amplifier, the differential amplifier having a positive input, a negative input, and an output, where, in a first mode, the positive input is connected to the first transistor at the connection to the first current source, the negative input is connected to the second transistor at the connection to the second current source, and the output is connected to a base of the second transistor,
   such that, in the first mode, a voltage of the output of the differential amplifier is a complementary-to-absolute-temperature voltage, that is a function of a temperature of the reference circuit.

2. The reference circuit of claim 1, further comprising an inverting amplifier comprising an input and an output, the input of the inverting amplifier being connected to the connection of the first transistor and the first current reference, the output of the inverting amplifier providing the complementary-to-absolute-temperature voltage.

3. The reference circuit of claim 1, further comprising a number of switches, whereby the differential amplifier is configured to buffer a selected voltage by, via the switches, disconnecting connections to the inputs and output of the differential amplifier used in the first mode, connecting the output of the differential amplifier to the negative input of the differential amplifier, and connecting the positive input of the differential amplifier to the selected voltage.

4. The reference circuit of claim 3, wherein, in a second mode, the selected voltage is set to the proportional-to-absolute-temperature voltage by connecting, via the switches, the positive input of the differential amplifier to the connection between the first transistor and the first current source.

5. The reference circuit of claim 4, wherein, in a third mode, the selected voltage is set to a stored sample proportional to the proportional-to-absolute-temperature voltage by connecting, via the switches, the positive input of the differential amplifier to a first storage capacitor.

6. The reference circuit of claim 5, wherein, in a fourth mode, the selected voltage is set to the bias voltage by connecting, via the switches, the positive input of the differential amplifier to the bias voltage reference.

7. The reference circuit of claim 3, wherein the second transistor is of a different size than the first transistor by a first factor, such that, in the first mode, the proportional-to-absolute-temperature voltage is further a function of the first factor.

8. The reference circuit of claim 3, wherein the second current source is of a different size than the first current source by a second factor, such that, in the first mode, the proportional-to-absolute-temperature voltage is further a function of the first factor times the second factor.

9. The reference circuit of claim 3, further comprising an inverting amplifier comprising an input and an output, the input of the inverting amplifier being connected to the output of the differential amplifier, whereby, in the first mode, the output of the inverting amplifier produces a proportional-to-temperature voltage that is a function of a temperature of the reference circuit.

10. The reference circuit of claim 3, wherein the first transistor and second transistor are NPN BJT transistors and the first current source and the second current source comprise MOS cascode devices.

11. A zero-to-absolute-temperature circuit comprising:
    a first transistor, the first transistor being connected between a power source and a first current reference to produce a proportional-to-absolute-temperature voltage, which when inverted or subtracted can be used as a complementary-to-absolute voltage, at the connection of the first transistor and the first current reference;
    a bias voltage reference, the bias voltage reference being connected to a base of the first transistor;
    a second transistor, the second transistor being connected between the power source and a second current reference;
    a differential amplifier, the differential amplifier having a positive input, a negative input, and an output, where, in a first mode, the positive input is connected to the first transistor at the connection to the first current source, the negative input is connected to the second transistor at the connection to the second current source, and the output is connected to a base of the second transistor; and
    a switched-capacitor amplifier, the switched capacitor amplifier amplifying the output of the differential amplifier, the switched capacitor amplifier having a first gain set by capacitor ratios and a second gain second by a number of iterations; such that, in the first mode, a voltage of the output of the differential amplifier is a complementary-to-absolute-temperature voltage that is a function of a temperature of the reference circuit, and in the first mode, a voltage output of the switched capacitor amplifier is proportional to the proportional-to-absolute temperature.

12. The zero-to-absolute-temperature circuit of claim 11, further comprising a number of switches, whereby the differential amplifier is configured to buffer a selected voltage by, via the switches, disconnecting the connections to the inputs and output of the differential amplifier used in the first mode, connecting the output of the differential amplifier to the negative input of the differential amplifier, and connecting the positive input of the differential amplifier to the selected voltage.

13. The zero-to-absolute-temperature circuit of claim 12, wherein, in a second mode, the selected voltage is set to the complementary-to-absolute-temperature voltage by connecting, via the switches, to the connection between the first transistor and the first current source and samples this voltage onto a capacitor in the switch capacitor amplifier.

14. The zero-to-absolute-temperature circuit of claim 13, wherein, the selected voltage is set to a stored sample of a voltage proportional to the proportional-to-absolute-temperature voltage, in a third mode, by connecting, via the switches, the positive input of the differential amplifier to a first storage capacitor.

15. The zero-to-absolute-temperature circuit of claim 14, further comprising a digital state machine, the digital state machine being configured to manipulate the modes of the differential amplifier and the second gain of the switched capacitor amplifier, whereby using the switches, the switched capacitor amplifier, and a number of storage capacitors, the proportional-to-absolute-temperature voltage is compensated by the complementary-to-absolute-temperature voltage to produce a zero-to-ab solute-temperature voltage.

16. The zero-to-absolute-temperature circuit of claim 15, further comprising an analog-to-digital converter, where the zero-to-absolute-temperature voltage is used to calibrate out the offset of the analog-to-digital converter.

17. A method of temperature measurement, comprising:
generating a proportional-to-absolute-temperature voltage using a first transistor, a bias voltage reference, and a first current reference, where the first transistor is connected between a power source and a first current reference and the bias voltage reference is connected to a base of the first transistor;
generating a complementary-to-absolute-temperature voltage using a second transistor, a second current reference, and a differential amplifier, where the second transistor is connected between the power source and the second current reference, the differential amplifier has a positive input, a negative input, and an output, the positive input is being connected to the first transistor at the connection to the first current source, the negative input being connected to the second transistor at the connection to the second current source, and the output being connected to a base of the second transistor, where the complementary-to-absolute-temperature voltage is generated at the base of the second transistor; and
ratio-metrically combining the complementary-to-absolute-temperature voltage and the proportional-to-absolute-temperature voltage via a configurable switched capacitor amplifier network to derive a zero-to-absolute-temperature reading.

18. The method of claim 17, further comprising selecting the first and second transistors such that the second transistor is of a different size than the first transistor by a first factor, whereby the proportional-to-absolute-temperature voltage is a function of the first factor.

19. The method of claim 18, wherein selecting the first and second transistors includes selecting the second current source to be of a different size than the first current source by a second factor, whereby the proportional-to-absolute-temperature voltage is a function of the first factor times the second factor.

20. The method of claim 17, further comprising manipulating the modes of the differential amplifier whereby the proportional-to-absolute-temperature voltage is compensated by the complementary-to-absolute-temperature voltage to produce a zero-to-absolute-temperature voltage.

* * * * *